US012044852B2

(12) United States Patent
Noguchi et al.

(10) Patent No.: US 12,044,852 B2
(45) Date of Patent: Jul. 23, 2024

(54) VIRTUAL IMAGE DISPLAY APPARATUS

(71) Applicant: SEIKO EPSON CORPORATION, Tokyo (JP)

(72) Inventors: Toshiyuki Noguchi, Shiojiri (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 503 days.

(21) Appl. No.: 17/513,154

(22) Filed: Oct. 28, 2021

(65) Prior Publication Data

US 2022/0137415 A1 May 5, 2022

(30) Foreign Application Priority Data

Oct. 29, 2020 (JP) ................. 2020-181459

(51) Int. Cl.
  *G02B 27/01* (2006.01)
  *G02B 17/08* (2006.01)
(52) U.S. Cl.
  CPC ......... *G02B 27/0172* (2013.01); *G02B 17/08* (2013.01); *G02B 2027/0178* (2013.01)

(58) Field of Classification Search
None
See application file for complete search history.

(56) References Cited

U.S. PATENT DOCUMENTS

2018/0217380 A1* 8/2018 Nishimaki ......... G02B 27/0176

FOREIGN PATENT DOCUMENTS

JP 2017-211674 A 11/2017

* cited by examiner

*Primary Examiner* — Bao-Luan Q Le
*Assistant Examiner* — Danell L Owens
(74) *Attorney, Agent, or Firm* — Oliff PLC

(57) ABSTRACT

A virtual image display apparatus according to the present disclosure includes a first display module, a second display module, and a coupling portion having an adjustable structure. The adjustable structure adjusts the first display module with respect to the second display module at least a relative rotational position and relative positions in longitudinal and depth directions.

8 Claims, 10 Drawing Sheets

VIRTUAL IMAGE DISPLAY APPARATUS

The present application is based on, and claims priority from JP Application Serial Number 2020-181459, filed Oct. 29, 2020, the disclosure of which is hereby incorporated by reference herein in its entirety.

BACKGROUND

1. Technical Field

The present disclosure relates to a virtual image display apparatus.

2. Related Art

Hitherto, there has been known a virtual image display apparatus that enables observation of a virtual image by allowing an optical element such as a projection lens to guide, to a pupil of an observer, imaging light emitted from a display element. JP-A-2017-211674 discloses a virtual image display apparatus including a display element, a display element case that accommodates and supports the display element, a projection optical system that projects light from the display element, a lens barrel that accommodates and supports the projection optical system and is coupled to the display element case, and a light-guiding device that directs light from the projection optical system to an eye of an observer so that the observer can visually recognize an image.

JP-A-2017-211674 discloses that the display element is positioned with respect to the projection optical system by using a positioning portion including a protruding portion provided to one of the display element and the lens barrel and a recessed portion provided to the other component. Further, JP-A-2017-211674 discloses that a right-eye light-guiding optical system and a left-eye light-guiding optical system are arranged in front of the eyes of the observer by attaching each of the right-eye light-guiding optical system and the left-eye light-guiding optical system to a frame.

In the existing virtual image display apparatus, when positioning between the display element and the projection optical system is performed, a supporting member exemplified by the lens barrel for supporting the optical members is required. However, a manufacturing error and an assembly tolerance of the frame may affect accuracy of positioning adjustment between a right-eye image and a left-eye image because each of the right-eye light-guiding optical system and the left-eye light-guiding optical system is attached to the frame.

SUMMARY

In order to solve the above-mentioned problem, a virtual image display apparatus according to one aspect of the present disclosure includes a first display module, a second display module, and a coupling portion configured to couple the first display module and the second display module to each other, the coupling portion having an adjustment structure, wherein the adjustment structure adjusts the position of the first display module with respect to the second display module at least in a longitudinal direction that intersects a lateral direction toward the second display module from the first display module and in a depth direction that intersects the longitudinal direction and the lateral direction respectively, the adjustment structure adjusts the position of the first display module with respect to the second display module at least in a rotation direction that rotates around an axis in the longitudinal and in a rotation position that rotates around axis in the depth direction.

A method of manufacturing a virtual image display apparatus according to one aspect of the present disclosure, the virtual image display apparatus including a first display module configured to form a first virtual image for a right eye, a second display module configured to form a second virtual image for a left eye, and a coupling portion configured to couple the first display module and the second display module to each other, the first display module including a first display element configured to emit first imaging light for the right eye, a first display element supporting member configured to support the first display element, a first projection optical system configured to project the first imaging light emitted from the first display element to form a first exit pupil, and a first projection optics supporting member configured to support the first projection optical system, the first display element supporting member including any one of a first protruding portion and a first recessed portion, and the first projection optics supporting member including another one of the first protruding portion and the first recessed portion, the first protruding portion being arranged inside the first recessed portion with a clearance from the first recessed portion, the second display module including a second display element configured to emit second imaging light for the left eye, a second display element supporting member configured to support the second display element, a second projection optical system configured to project the second imaging light emitted from the second display element to form a second exit pupil, and a second projection optics supporting member configured to support the second projection optical system, the second display element supporting member including any one of a second protruding portion and a second recessed portion, and the second projection optics supporting member including another one of the second protruding portion and the second recessed portion, the second protruding portion being arranged inside the second recessed portion with a clearance from the second recessed portion, and the coupling portion having an adjustment structure configured to adjust a relative positional relationship between the first projection optics supporting member and the second projection optics supporting member, the method including a first adjustment step for adjusting at least one of a relative rotational position, a relative position in a longitudinal direction, a relative position in a lateral direction, and a relative position in a depth direction between the first display element supporting member and the first projection optics supporting member in a state in which the first protruding portion and the first recessed portion are fitted to each other, a second adjustment step for adjusting at least one of a relative rotational position, a relative position in a longitudinal direction, a relative position in the lateral direction, and a relative position in the depth direction between the second display element supporting member and the second projection optics supporting member in a state in which the second protruding portion and the second recessed portion are fitted to each other, and a third adjustment step for adjusting, using the adjustment structure of the coupling portion, at least one of a relative rotational position, a relative position in the longitudinal direction, and a relative position in the depth direction between the first projection optics supporting member and the second projection optics supporting member.

DESCRIPTION OF EXEMPLARY EMBODIMENTS

First Exemplary Embodiment

With reference to FIG. 1 to FIG. 12, a first exemplary embodiment of the present disclosure is described below.

Figure 1:
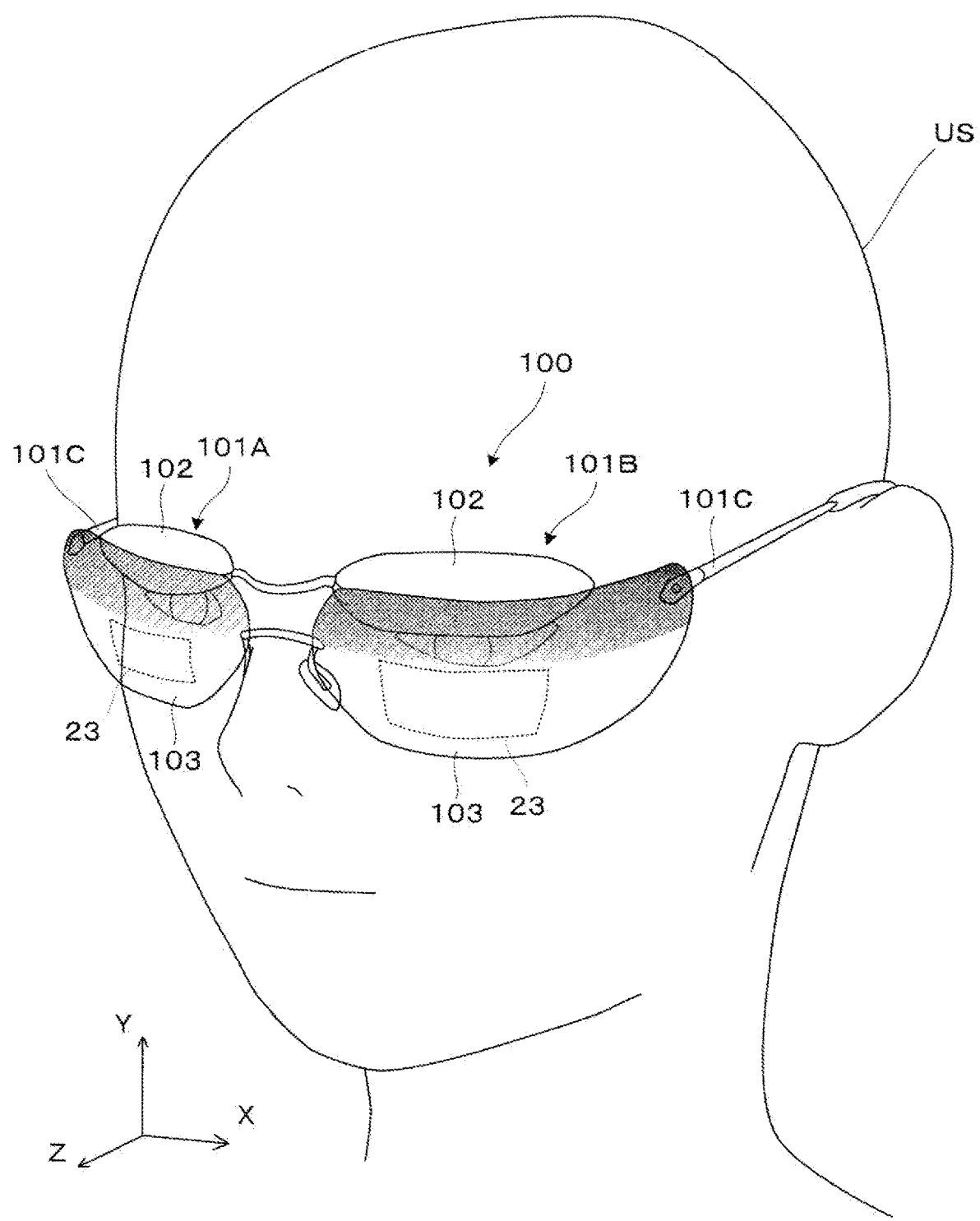
FIG. 1 is an external perspective view illustrating a state in which a virtual image display apparatus of a first exemplary embodiment is worn.
Figure 2:
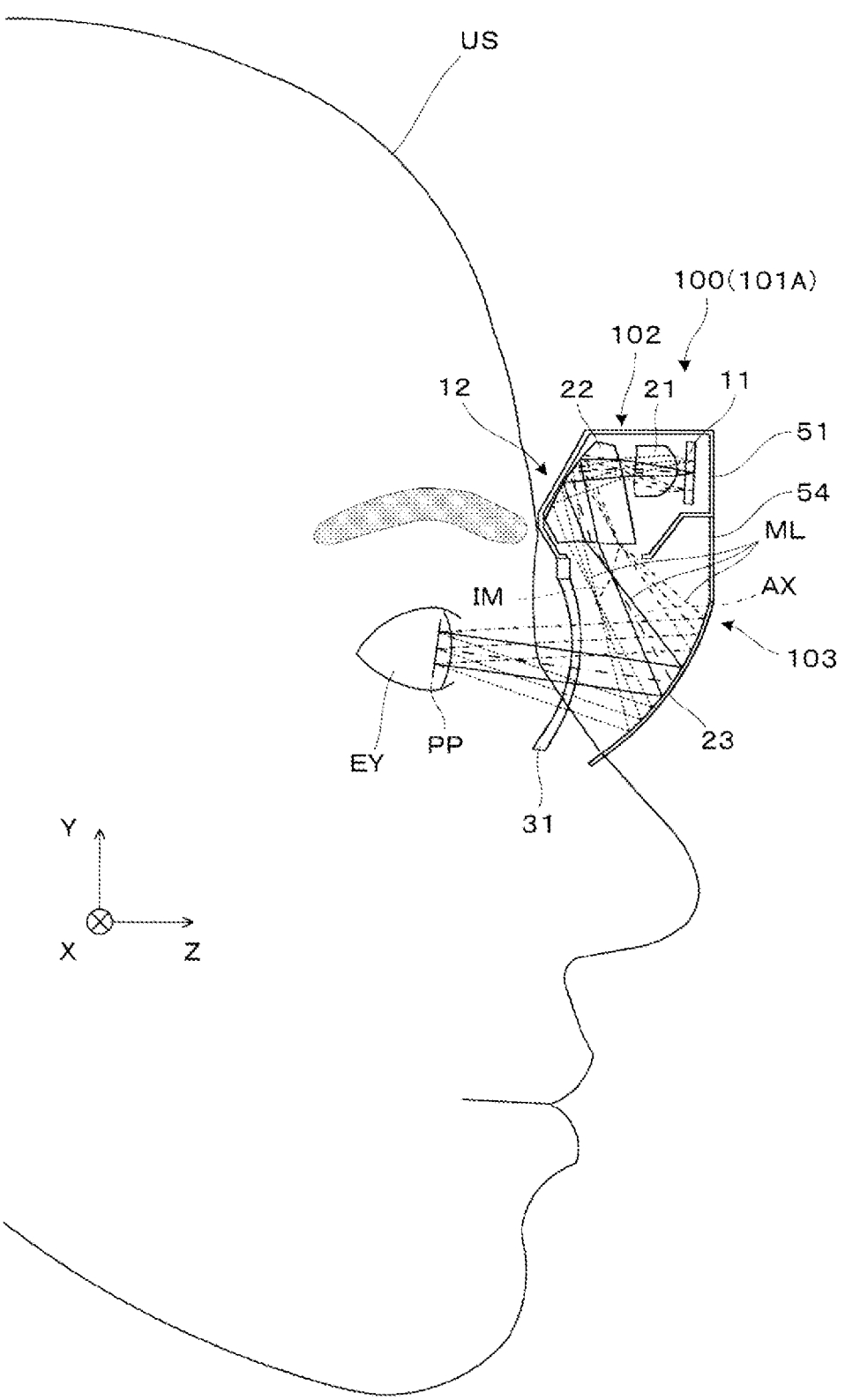
FIG. 2 is a longitudinal cross-sectional view of the virtual image display apparatus.
Figure 3:
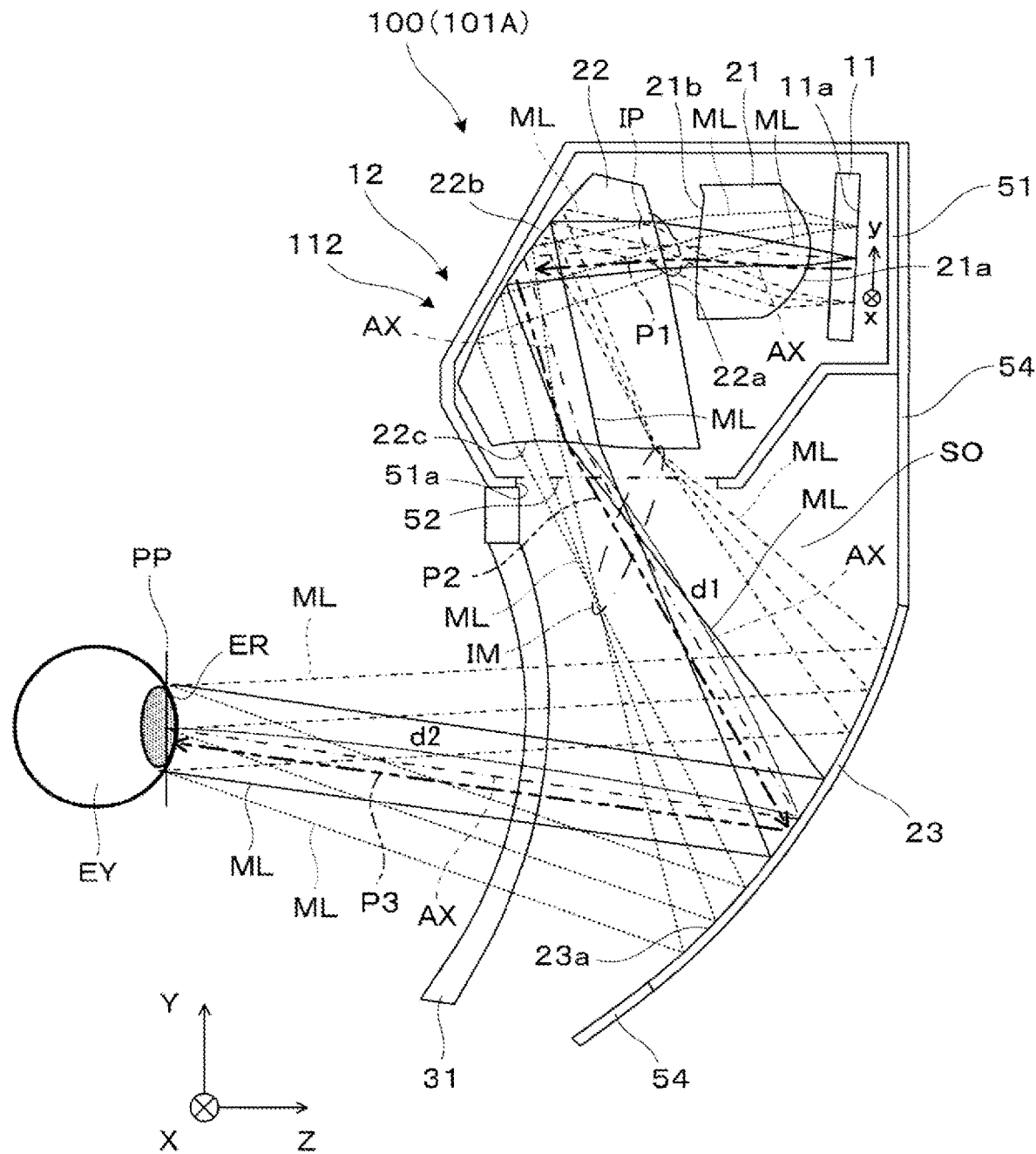
FIG. 3 is a longitudinal cross-sectional view illustrating an inner structure of the virtual image display apparatus.

FIG. 1 is an external perspective view illustrating a state in which a virtual image display apparatus of the present exemplary embodiment is worn. FIG. 2 is a longitudinal cross-sectional view of the virtual image display apparatus. FIG. 3 is a longitudinal cross-sectional view illustrating an inner structure of the virtual image display apparatus.

Note that, in the drawings, the dimensions of some components may be scaled differently for ease of understanding for the components.

As illustrated in FIG. 1 and FIG. 2, a virtual image display apparatus 100 of the present exemplary embodiment is a head-mounted display (HMD), and causes an observer or a user US to recognize video as a virtual image.

In FIG. 1 and FIG. 2, X, Y, and Z define an orthogonal coordinate system. A +X direction and a –X direction correspond to a direction in which both the eyes of the user US wearing the virtual image display apparatus 100 are aligned, and are defined as a lateral direction in the present specification. The +X direction corresponds to a rightward direction as viewed from the user US, and the –X direction corresponds to a leftward direction as viewed from the user US. A +Y direction and a –Y direction corresponds to a direction orthogonal to the lateral direction in which both the eyes of the user US are aligned, and are defined as a longitudinal direction in the present specification. The +Y direction corresponds to an upward direction, and the –Y direction corresponds to a downward direction. A +Z direction and a –Z direction are orthogonal to the +X direction and the –X direction, and the +Y direction and the –Y direction, respectively, correspond to a front-back direction as viewed from the user US, and are defined as a depth direction in the present specification. The +Z direction corresponds to a frontward direction, and the +Z direction corresponds to a backward direction.

The virtual image display apparatus 100 includes a first display module 101A that forms a first virtual image with respect to a right eye, a second display module 101B that forms a second virtual image with respect to a left eye, and temple-like supporting members 101C that support the first display module 101A and the second display module 101B.

The first display module 101A includes an optical unit 102 that is arranged as an upper part and an external member 103 that has an eye-glass lens shape covering the entirety. Similarly to the first display module 101A, the second display module 101B includes the optical unit 102 that is arranged as an upper part and the external member 103 that has an eye-glass lens shape covering the entirety. The supporting members 101C supports the first display module 101A and the second display module 101B at the upper ends of the external members 103 via members (not illustrated) arranged behind the external members 103.

The second display module 101B has a structure identical to that of the first display module 101A. Thus, only the first display module 101A is described below, and description of the second display module 101B is omitted. Further, in the following description, the first display module 101A is simply referred to as a display module 101A.

As illustrated in FIG. 2 and FIG. 3, the display module 101A includes a display element 11 and a projection optical system 12 as optical elements. The projection optical system 12 guides imaging light ML from the display element 11 to a pupil position PP, and in this regard, is referred to as a light-guiding optical system in some cases. The projection optical system 12 includes a projection lens 21, a prism 22, and a see-through mirror 23.

The display module 101A of the present exemplary embodiment corresponds to the first display module and the second display module in the scope of the claims. The display element 11 of the present exemplary embodiment corresponds to the first display element and the second display element in the scope of the claims. The projection optical system 12 of the present exemplary embodiment corresponds to the first projection optical system and the second projection optical system in the scope of the claims. The projection lens 21 of the present exemplary embodiment corresponds to the first projection lens and the second projection lens in the scope of the claims. The prism 22 of the present exemplary embodiment corresponds to the first prism and the second prism in the scope of the claims. The see-through mirror 23 of the present exemplary embodiment corresponds to the first see-through mirror and the second see-through mirror in the scope of the claims.

The display element 11 is constituted of, for example, a display device of a self-light emission type exemplified by an organic electroluminescence (EL) element, an inorganic EL element, a light emitting diode (LED) array, an organic LED, a laser array, a quantum dot light emission type element, and the like. The display element 11 forms a still image or a moving image in color on a two-dimensional display surface 11a. The display element 11 is driven by a driving control circuit (not illustrated), and performs a display operation.

When an organic EL display or a display device is used as the display element 11, the display element 11 is configured to include an organic EL control unit. When a quantum dot light emission type display is used as the display element 11, the display element 11 is configured to emit light colored with green or red by irradiating a quantum dot film with light of a blue light emitting diode (LED). The display element 11 is not limited to a display element of a self-light emission type. The display element 11 may be constituted of a liquid crystal display (LCD) or a light modulating element of other types, and may form an image by illuminating the light modulating element with a light source such as a backlight. As the display element 11, a liquid crystal on silicon (LCOS, LCOS is a trade name), a digital micromirror device, and the like may be used instead of the LCD. Note that the display element 11 may be constituted of a single display element, or may include a plurality of display elements and a synthesizing element such as a dichroic prism and have a configuration in which a plural pieces of light from the plurality of display elements is synthesized by the synthesizing element and emitted.

As illustrated in FIG. 3, the projection lens 21 condenses the imaging light ML emitted from the display element 11 to a state close to a parallel luminous flux. The projection lens 21 is a single lens in the illustrated example, and includes an incident surface 21a and an emitting surface 21b. The prism 22 includes an incident surface 22a, an inner reflection surface 22b, and an emitting surface 22c. In the prism 22, the imaging light ML emitted from the projection lens 21 is refracted at the incident surface 22a to enter the prism 22, is totally reflected at the inner reflection surface 22b, and is refracted at and emitted from the emitting surface 22c. The see-through mirror 23 reflects the imaging light ML emitted from the prism 22 to the pupil position PP, and forms an exit pupil. A position at which the exit pupil is formed is referred to as a pupil position PP. In a predetermined dispersed state or parallel state, imaging light from each point on the display surface 11a enters the pupil position PP in a superposing manner from an angle direction corresponding to a position of each point on the display surface 11a. In the projection optical system 12 of the present exemplary embodiment, a field of view (FOV) is at 44 degrees. A display region of a virtual image formed by the projection optical system 12 is a rectangular shape, and the above-mentioned angle of 44 degrees is an angle in a diagonal direction. In the present exemplary embodiment, description is given representatively with the first display module 101A for the right eye, and hence the above-mentioned exit pupil corresponds to the first exit pupil in the scope of the claims. The exit pupil formed in the second display module 101B for the left eye corresponds to the second exit pupil in the scope of the claims.

The projection lens 21 and the prism 22 are accommodated together with the display element 11 in a case 51. The case 51 is formed of a shading material, and incorporates a driving circuit (not illustrated) that operates the display element 11. The case 51 has an opening 51a, and the opening 51a has such a size that the imaging light ML from the prism 22 to the see-through mirror 23 does not interfere with the case 51. The opening 51a of the case 51 is covered with a protection cover 52 having optical transparency. The protection cover 52 is formed of a material such as a resin that does not have optical power and allows the imaging light ML to pass therethrough without being attenuated. The protection cover 52 enables an accommodation space inside the case 51 to be in a sealed state, and can improve functions such as protection against dust, dew prevention, and contact prevention with respect to an optical surface. The see-through mirror 23 is supported on the case 51 through intermediation of a supporting plate 54. The case 51 or the supporting plate 54 is supported on the supporting member 101C illustrated in FIG. 1, and the external member 103 is constituted of the supporting plate 54 and the see-through mirror 23.

The projection optical system 12 is constituted of an off-axis optical system, and the projection lens 21, the prism 22, and the see-through mirror 23 are arranged at positions that constitute an off-axis system 112. The off-axis optical system described herein indicates that an entire optical path is bent before or after a light beam enters at least one reflection surface or refraction surface of the projection lens 21, the prism 22, and the see-through mirror 23 that constitute the projection optical system 12. In the projection optical system 12, that is, in the off-axis system 112, bending of an optical axis AX is performed so that the optical axis AX extends along an off-axis plane SO corresponding to the paper plane.

Specifically, when bending of the optical axis AX is performed on the off-axis plane SO, the projection lens 21, the prism 22, and the see-through mirror 23 are arrayed along the off-axis plane SO in the projection optical system 12. The off-axis plane SO is a plane that causes asymmetry on the off-axis system 112 in a multistage manner. In the present specification, the optical axis AX is defined as an axis that extends along an optical path of a main light beam emitted from the center of the display element 11 and passes through an eye ring ER corresponding to an eye point or the center of the pupil. Specifically, the off-axis plane SO on which the optical axis AX is arranged is parallel to the YZ plane, and passes through the center of the display element 11 and the center of the eye ring ER corresponding to the eye point. As viewed in a lateral cross section, the optical axis AX is arranged in a Z-like shape. Specifically, on the off-axis plane SO, the optical axis is folded back twice in a Z-like shape to obtain arrangement of an optical path P1 from the projection lens 21 to the inner reflection surface 22b, an optical path P2 from the inner reflection surface 22b to the see-through mirror 23, and an optical path P3 from the see-through mirror 23 to the pupil position PP.

The optical path P1 from the projection lens 21 to the inner reflection surface 22b in the projection optical system 12 is arranged nearly parallel to the Z direction. Specifically, along the optical path P1, the optical axis AX extends substantially parallel to the Z direction or the frontward direction. The projection lens 21 is arranged at a position sandwiched between the prism 22 and the display element 11 with respect to the Z direction or the frontward direction. In this case, the optical path P1 from the prism 22 to the display element 11 is nearly the frontward direction. It is desired that orientation of the optical axis AX along the optical path P1 fall within a range substantially from −30 degrees to +30 degrees on average, where the downward direction and the upward direction along the Z direction is negative and positive, respectively. When the optical axis AX along the optical path P1 is oriented downward at −30 degrees or greater in the Z direction, the projection lens 21 or the display element 11 can be prevented from interfering with the see-through mirror 23. Further, when the optical axis AX along the optical path P1 is oriented upward at +30 degrees or less in the Z direction, the projection lens 21 and the display element 11 can be prevented from protruding upward, which can avoid obtrusive appearance.

It is desired that the optical axis AX along the optical path P2 from the inner reflection surface 22b to the see-through mirror 23 fall within a range substantially from −70 degrees to −45 degrees on average, where the downward direction and the upward direction along the Z direction is negative and positive, respectively. When the optical axis AX along the optical path P2 is oriented downward at −70 degrees or greater in the Z direction, a space for arranging an inner lens 31 can be secured between the see-through mirror 23 and the pupil position PP, and the entire inclination of the see-through mirror 23 can be prevented from being excessively increased. Further, when the optical axis AX along the optical path P2 is oriented downward at −45 degrees or less in the Z direction, the prism 22 can be prevented from being arranged to largely protrude in the −Z direction or the backward direction with respect to the see-through mirror 23, and the thickness of the projection optical system 12 can be prevented from being increased.

Figure 4:
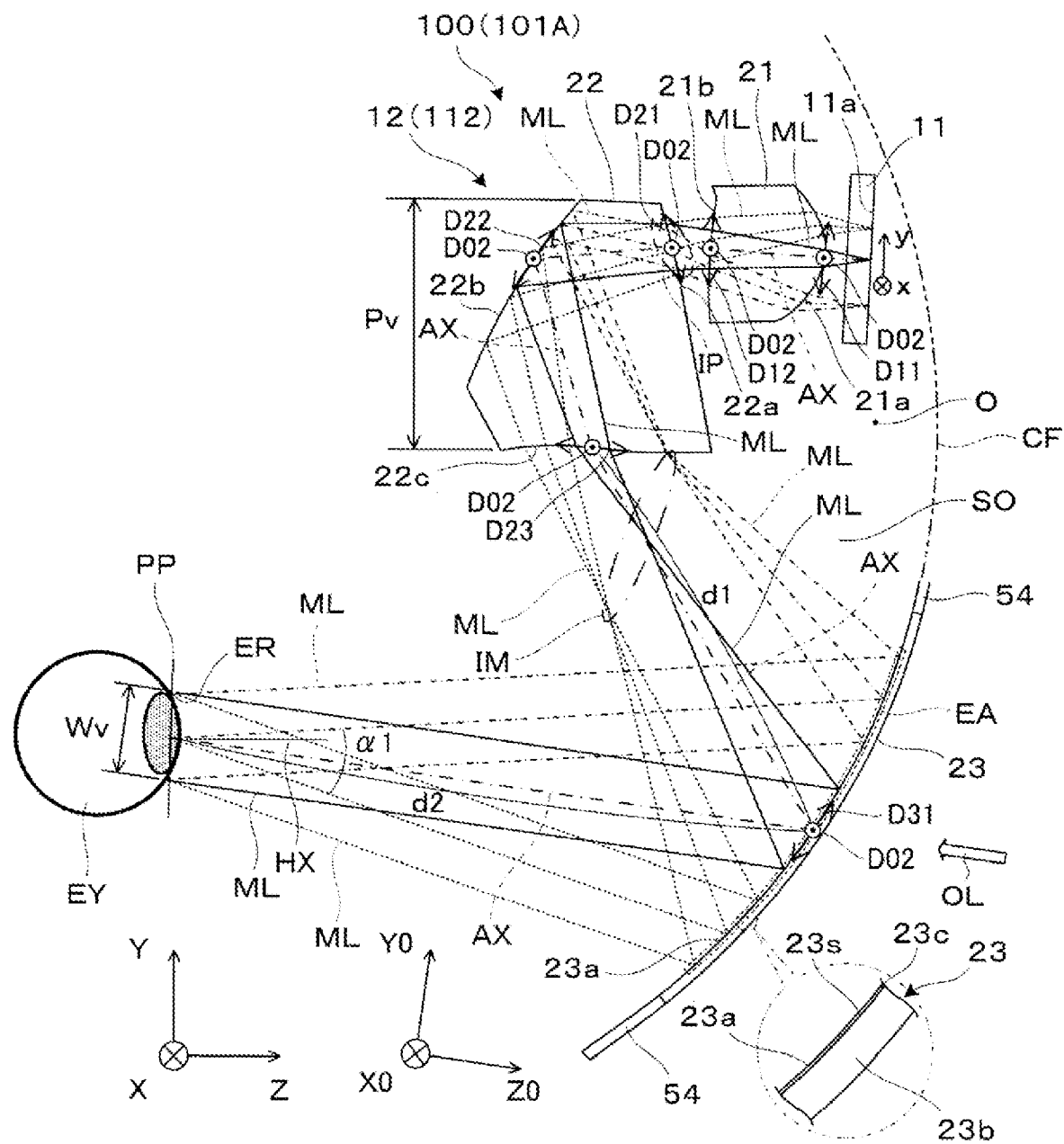
FIG. 4 is a longitudinal cross-sectional view illustrating an optical system of the virtual image display apparatus.

The optical path P3 from the see-through mirror 23 to the pupil position PP is arranged nearly parallel to the Z direction. In the illustrated example, the optical axis AX is oriented at substantially −10 degrees, where the downward direction along the Z direction is negative. This is because a human sight line is stable with slightly lowered eyes when being inclined downward at approximately 10 degrees with respect to the horizontal direction. Note that a center axis HX in the horizontal direction with respect to the pupil position PP, which is illustrated in FIG. 4, is given, assuming that the user US wearing the virtual image display apparatus 100 gazes in the horizontal direction or the horizontal line in an upright and relaxed posture while facing the front. A shape and a posture of a head including arrangement of eyes, arrangement of ears, and the like may vary depending on individual users US wearing the virtual image display apparatus 100. However, an average head shape head posture of a user US is assumed, and hence an average center axis HX can be set for the virtual image display apparatus 100 of interest. From the above results, at the inner reflection surface 22b of the prism 22, a reflection angle of a light beam along the optical axis AX is approximately from 10 degrees to 60 degrees. Further, at the see-through mirror 23, a reflection angle of a light beam along the optical axis AX is approximately from 20 degrees to 45 degrees.

With regard to the optical path P2 and the optical path P3 of the main light beam, a distance d1 between the see-through mirror 23 and the prism 22 is set to be equal to or less than a distance d2 between the see-through mirror 23 and the pupil position PP. In this case, a protruding amount by which the prism 22 protrudes around, that is, above the see-through mirror 23 can be suppressed. In this case, the distances d1 and d2 are distances along the optical axis AX. When another optical element is additionally provided on the optical paths P2 and P3 inside the see-through mirror 23, the values of the distances d1 and d2 may be determined by converting the added optical element into an optical path length or an optical distance.

In the projection optical system 12, a position of a light beam passing through the uppermost side in the longitudinal direction is equal to or less than 30 mm from the center of the pupil position PP as a reference in the longitudinal direction or the Y direction. When the light beam falls within the range describe above, the projection lens 21 or the display element 11 can be prevented from being arranged to protrude upward or in the +Y direction. With this, an amount by which the projection lens 21 or the display element 11 protrudes above an eyebrow can be suppressed, and designability can be secured. Specifically, the optical unit 102 including the display element 11, the projection lens 21, and the prism 22 can be reduced in size.

Further, in the projection optical system 12, positions of all the light beams from the see-through mirror 23 to the display element 11 are set to be equal to or greater than 13 mm from the pupil position PP as a reference in the frontward direction or the Z direction. When the light beam falls within the range describe above, particularly, the see-through mirror 23 can be arranged sufficiently away from the pupil position PP in the frontward direction or the +Z direction. With this, a space for arranging the inner lens 31 is secured easily on a reflection surface 23a side of the see-through mirror 23.

Further, in the projection optical system 12, positions of all the light beams from the see-through mirror 23 to the display element 11 are set to be equal to or less than 40 mm from the pupil position PP as a reference in the frontward direction or the Z direction. When the light beam falls within the range describe above, particularly, the see-through mirror 23 can be prevented from being arranged excessively away from the pupil position PP in the frontward direction or the +Z direction. With this, frontward protrusion of the see-through mirror 23, the display element 11, and the like can be suppressed, and designability can be secured. The lower end of the prism 22 is arranged at a position that is equal to or greater than 10 mm from the center of the pupil position PP as a reference in the longitudinal direction or the Y direction. With this, for example, a see-through visual field at 20 degrees in the upward direction can be secured easily.

On the off-axis plane SO, an intermediate pupil IP is arranged between the projection lens 21 and the inner reflection surface 22b of the prism 22, on a side closer to the incident surface 22a of the prism 22 than the projection lens 21 and the inner reflection surface 22b. More specifically, the intermediate pupil IP is arranged at the position of or in the vicinity of the incident surface 22a of the prism 22. For example, the intermediate pupil IP is arranged on the inner reflection surface 22b side with respect to the incident surface 22a of the prism 22. In this case, the position of the intermediate pupil IP is in a state closer to the incident surface 22a than the inner reflection surface 22b. The intermediate pupil IP may be arranged on the projection lens 21 side with respect to the incident surface 22a of the prism 22. In this case, the position of the intermediate pupil IP is in a state closer to the incident surface 22a than the emitting surface 21b of the projection lens 21. The intermediate pupil IP may intersect with the incident surface 22a of the prism 22. The intermediate pupil IP indicates a position at which imaging light from each point on the display surface 11a spreads most in an overlapping manner, and is arranged at a conjugate point of the eye ring ER or the pupil position PP. It is desired that an aperture stop be arranged at the position of or in the vicinity of the intermediate pupil IP.

An intermediate image IM is formed between the prism 22 and the see-through mirror 23. The intermediate image IM is formed at a position closer to the prism 22 than an intermediate point between the see-through mirror 23 and the prism 22. The intermediate image IM is formed near the prism 22 as described above. Thus, a load caused by an enlarged image due to the see-through mirror 23 can be reduced, and an aberration of a virtual image to be observed can be suppressed. However, the intermediate image IM is not in a state of intersecting with the emitting surface 22c of the prism 22. Specifically, the intermediate image IM is formed outside of the emitting surface 22c, and this arrangement relationship is satisfied at any point in the lateral direction or the X direction vertical to the off-axis plane SO on the emitting surface 22c as well as on the off-axis plane SO. The intermediate image IM is formed not to traverses the emitting surface 22c of the prism 22 as described above. With this, dust or a scratch on the front surface of the emitting surface 22c can be prevented from affecting image formation.

The intermediate image IM is a real image formed at a position that is upstream of the eye ring ER in the optical path and is conjugate to the display surface 11a. The intermediate image IM has a pattern corresponding to a display image on the display surface 11a. However, the image is not necessarily required to be formed sharply, and may indicate an aberration such as image surface curvature and distortion aberration. An aberration of the intermediate image IM is not a problem as long as the aberration is finally corrected satisfactorily for a virtual image observed at the pupil position PP.

Figure 5:
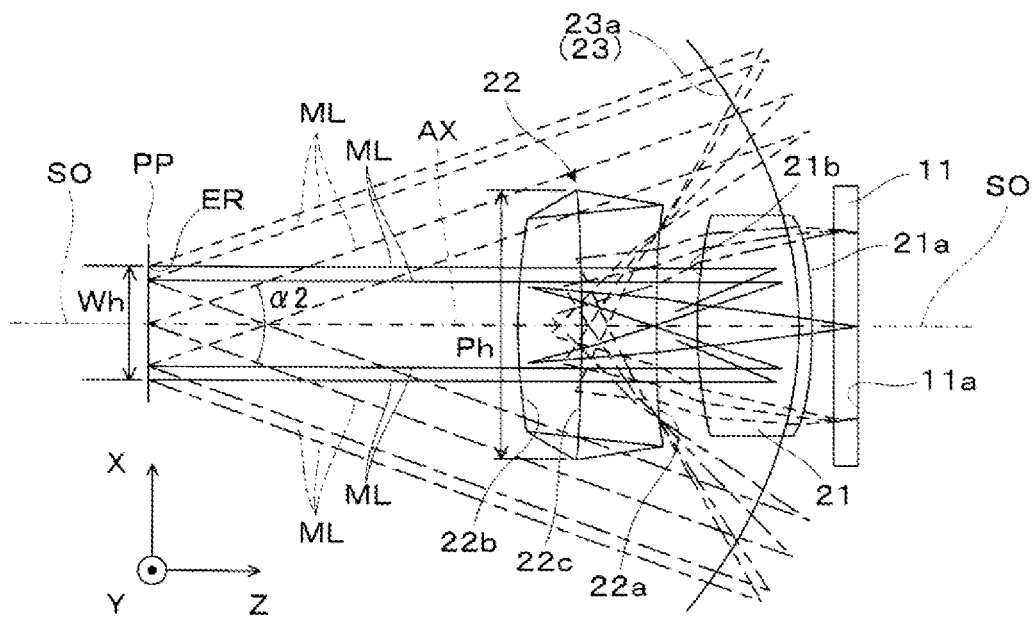
FIG. 5 is a plane cross-sectional view illustrating the optical system of the virtual image display apparatus.

With reference to FIG. 4 and FIG. 5, the shapes of the projection lens 21, the prism 22, and the see-through mirror 23 are described below in detail.

FIG. 4 is a longitudinal cross-sectional view illustrating the projection optical system 12. FIG. 5 is a plane cross-sectional view of the projection optical system 12. Note that, in FIG. 5, the incident surface 21a and the emitting surface 21b of the projection lens 21, the incident surface 22a, the inner reflection surface 22b, and the emitting surface 22c of the prism 22, and the reflection surface 23a of the see-through mirror 23 are illustrated in a projection state on the XZ plane through the optical axis AX.

The projection lens 21 of the present exemplary embodiment is constituted of a single lens. Note that the projection lens 21 may be constituted of a plurality of lenses. The shapes of the incident surface 21a and the emitting surface 21b being optical surfaces constituting the projection lens 21 have asymmetry across the optical axis AX with respect to first directions D11 and D12 in the longitudinal direction intersecting with the optical axis AX on the off-axis plane SO parallel to the YZ plane, and have symmetry across the optical axis AX with respect to the second direction D02 in the lateral direction orthogonal to the first directions D11 and D12 or the X direction. The first direction D11 in the longitudinal direction with respect to the incident surface 21a and the first direction D12 in the longitudinal direction with respect to the emitting surface 21b form a predetermined angle.

The projection lens 21 is formed of, for example, a resin, but may also be formed of glass. Each of the incident surface 21a and the emitting surface 21b of the projection lens 21 is constituted of, for example, a free form surface. Note that each of the incident surface 21a and the emitting surface 21b is not limited to a free form surface, and may be an aspheric surface. In the projection lens 21, each pf the incident surface 21a and the emitting surface 21b is formed as a free form surface or an aspheric surface, and thus reduction of an aberration can be achieved. Particularly, when a free form surface is used, an aberration of the projection optical system 12 being an off-axis optical system or a non-coaxial optical system can be reduced easily. Note that the free form surface is a surface without an axis of rotational symmetry, and various polynomials may be used as a surface function of the free form surface. Further, the aspheric surface is a surface having an axis of rotational symmetry, but is a paraboloid or a surface other than a spherical surface expressed by a polynomial. Although detailed description is omitted, an anti-reflection film is formed on each of the incident surface 21a and the emitting surface 21b.

The first direction D11 of the incident surface 21a and the first direction D12 of the emitting surface 21b form a predetermined angle in the projection lens 21 as described above, and hence, in the optical path of the main light beam from the center of the display surface 11a of the display element 11, the emitting surface 21b is formed to be inclined with respect to the incident surface 21a. Specifically, a relative angle or inclination is present between the incident surface 21a and the emitting surface 21b. Thus, in the projection lens 21, eccentricity of the projection optical system 12 as the off-axis system 112 can be partially compensated, which contributes to improvement of various aberrations. Further, the relative inclination between the incident surface 21a and the emitting surface 21b can partially compensate a color aberration of the projection lens 21.

The prism 22 is a refraction reflection optical member having a combined function of a mirror and a lens. Therefore, the prism 22 refracts and reflects the imaging light ML emitted from the projection lens 21. More specifically, the imaging light ML enters the inside of the prism 22 through the incident surface 22a being a refraction surface, is totally reflected in an irregular reflection direction at the inner reflection surface 22b being a reflection surface, and is emitted outside through the emitting surface 22c being a refraction surface.

Each of the incident surface 22a and the emitting surface 22c is an optical surface constituted of a curved surface, and contributes to improvement of resolution more as compared to only a reflection surface or the incident surface 22a and the emitting surface 22c being flat surfaces. The incident surface 22a, the inner reflection surface 22b, and the emitting surface 22c being optical surfaces constituting the prism 22 have asymmetry across the optical axis AX with respect to first directions D21, D22, and D23 in the longitudinal direction intersecting with the optical axis AX on the off-axis plane SO parallel to the YZ plane, and have symmetry across the optical axis AX with respect to the second direction D02 in the lateral direction orthogonal to the first directions D21, D22, and D23 or the X direction. In the prism 22, a horizontal width Ph in the lateral direction or the X direction is greater than a vertical width Pv in the longitudinal direction or the Y direction. In the prism 22, the horizontal width in the lateral direction or the X direction is greater than the vertical width in the longitudinal direction or the Y direction in terms of an optical effective area as well as a physical overall shape. With this, an angle of view in the lateral direction or the X direction can be increased. Further, as described later, motion of an eye EY is large in the lateral direction. In view of this, even when a sight line is largely changed in the lateral direction, an image can be visually recognized.

The prism 22 is formed of, for example, a resin, but may also be formed of glass. A refractive index of the prism 22 itself is set to be such a value that total reflection by the inner surface can be achieved by considering a reflection angle of the imaging light ML. It is desired that the refractive index or an abbe number of the prism 22 itself be set by considering a relationship with the projection lens 21. Particularly, when the abbe number of the prism 22 or the projection lens 21 is increased, color dispersion can be reduced.

The optical surface of the prism 22, that is, each of the incident surface 22a, the inner reflection surface 22b, and the emitting surface 22c is constituted of, for example, a free form surface. Note that each of the incident surface 22a, the inner reflection surface 22b, and the emitting surface 22c is not limited to a free form surface, and may be an aspheric surface. In the prism 22, each of the incident surface 22a, the inner reflection surface 22b, and the emitting surface 22c is a free form surface or an aspheric surface, and thus an aberration can be reduced.

Particularly, when a free form surface is used, an aberration of the projection optical system 12 being an off-axis optical system or a non-coaxial optical system can be reduced easily, and resolution can be improved. The inner reflection surface 22b is not limited to a surface that reflects the imaging light ML through total reflection, and may be a reflection surface formed of a metal film or a dielectric multilayer film. In this case, a reflection film constituted of a single layer film or a multilayer film formed of metal such as Al and Ag is formed on the inner reflection surface 22b by vapor deposition or the like. Alternatively, a sheet-like reflection film formed of metal is bonded on the inner reflection surface 22b. Although detailed description is omitted, an anti-reflection film is formed on each of the incident surface 22a and the emitting surface 22c.

The prism 22 can be formed collectively by injection-molding the incident surface 22a, the inner reflection surface 22b, and the emitting surface 22c. Thus, the number of components can be reduced, and the relative positions of the three surfaces can be achieved at a relatively low cost and at high accuracy to an extent of 20 μm or less, for example.

The see-through mirror 23 is a plate-like optical member that functions as a concave front surface mirror, and reflects the imaging light ML from the prism 22. The see-through mirror 23 covers the pupil position PP at which the eye EY or a pupil is arranged, and has a concave shape as viewed from the pupil position PP. The see-through mirror 23 is constituted of a reflection plate having a structure obtained by forming a mirror film 23c on one front surface 23s of a plate-like body 23b. The reflection surface 23a of the see-through mirror 23 is a front reflection surface having transparency.

The shape of the reflection surface 23a of the see-through mirror 23 has asymmetry across the optical axis AX with respect to a vertical first direction D31 intersecting with the optical axis AX on the off-axis plane SO parallel to the YZ plane, and have symmetry across the optical axis AX with respect to the second direction D02 orthogonal to the first direction 31 or the X direction. The reflection surface 23a of the see-through mirror 23 is constituted of, for example, a free form surface. Note that the reflection surface 23a is not limited to a free form surface, and may be an aspheric surface. When the see-through mirror 23 is a free form surface or an aspheric surface, an aberration can be reduced. Particularly, when a free form surface is used, an aberration of the projection optical system 12 being an off-axis optical system or a non-coaxial optical system can be reduced easily.

Even when the reflection surface 23a is any one of a free form surface and an aspheric surface, the see-through mirror 23 has such a shape that an original point O of a curved surface formula is shifted to the projection lens 21 side or the display element 11 side with respect to an effective area EA of the see-through mirror 23. In this case, it is possible to design the inclination surface of the see-through mirror that achieves an optical path having a Z-like shape without requiring an excessive burden on optical design. The above-mentioned curved surface formula of the reflection surface 23a corresponds to the shape of a curved line CF indicated with the two-dot chain line on the off-axis plane SO, for example. Thus, the original point O that gives symmetry is arranged between the upper end of the see-through mirror 23 and the lower end of the display element 11.

The see-through mirror 23 is a reflection element of a transparent type that reflects part of the light entering the see-through mirror 23 and allows the other part of the light to pass therethrough. Therefore, the mirror film 23c of the see-through mirror 23 has semi-transparent reflectivity. With this, external light OL passes through the see-through mirror 23, and thus see-through view of externals is enabled, and a user can visually recognize a state obtained by superimposing a virtual image on an external image.

When the plate-like body 23b of the see-through mirror 23 has a thickness of equal to or less than approximately few millimeters, a change in magnification of the external image can be suppressed to low. It is desired that a reflectance of the mirror film 23c with respect to the imaging light ML and the external light OL be set to be equal to or greater than 10% and equal to or less than 50% in a range of an assumed incident angle of the imaging light ML in terms of securing luminance of the imaging light ML and facilitating observation of an external image by see-through.

The plate-like body 23b being a base member of the see-through mirror 23 is formed of, for example, a resin, but may also be formed of glass. The plate-like body 23b is formed of the same material as that of the supporting plate 54 that supports the plate-like body 23b from the periphery thereof, and has the same thickness of that of the supporting plate 54. The mirror film 23c is formed of, for example, a dielectric multilayer film including a plurality of dielectric layers having a film thickness adjusted. The mirror film 23c may also be constituted of a single layer film or a multilayer film formed of metal such as Al and Ag having a film thickness adjusted. The mirror film 23c may be formed by lamination of the above-mentioned film, but may also be formed by bonding a sheet-like reflection film.

The optical path in the projection optical system 12 is described below.

The imaging light ML emitted from the display element 11 enters the projection lens 21, and is emitted from the projection lens 21 in a substantially collimated state. The imaging light ML passing through the projection lens 21 enters the incident surface 21a of the prism 22 while being refracted, is reflected by the inner reflection surface 22b at a reflectance of nearly 100%, and is refracted again by the emitting surface 22c. The imaging light ML from the prism 22 enters the see-through mirror 23, and is reflected at a reflectance of equal to or less than approximately 50% on the reflection surface 23a. The imaging light ML reflected by the see-through mirror 23 enters the pupil position PP at which the eye EY or the pupil of the user US is arranged.

The intermediate image IM is formed at a position that is between the prism 22 and the see-through mirror 23 and is close to the emitting surface 22c of the prism 22. The intermediate image IM is formed by appropriately enlarging an image formed on the display surface 11a of the display element 11. Further, in addition to the imaging light ML, the external light OL passing through the see-through mirror 23 or the supporting plate 54 in the periphery of the see-through mirror 23 enters the pupil position PP. Specifically, the user US wearing the virtual image display apparatus 100 can observe a virtual image of the imaging light ML, which is superposed on an external image.

As apparent from the comparison between FIG. 4 and FIG. 5, with regard to the FOV of the projection optical system 12, a visual field angle α2 in the lateral direction is greater than a visual field angle α1 in the longitudinal direction. This corresponds to the fact that the display image formed on the display surface 11a of the display element 11 is longer in the horizontal direction than in the vertical direction. An aspect ratio of the dimension of the display surface 11a in the lateral direction to the dimension thereof in the longitudinal direction is set to be a value of, for example, 4:3 or 16:9.

Figure 6:
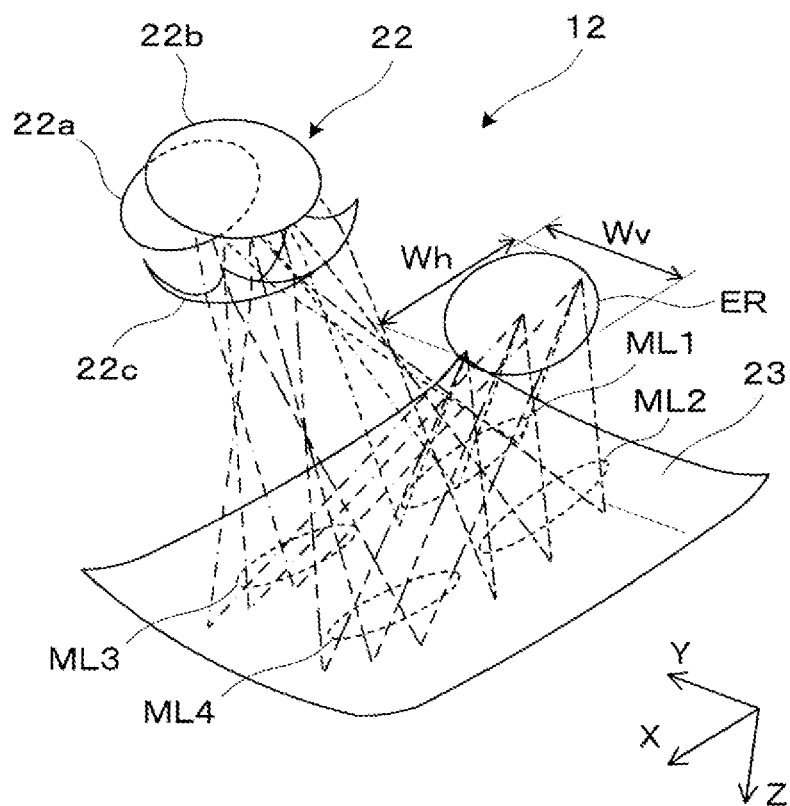
FIG. 6 is a perspective view for conceptually describing image formation by a projection optical system.

FIG. 6 is a perspective view for conceptually describing image formation by the projection optical system 12.

In FIG. 6, the imaging light ML1 indicates a light beam from the upper right direction in the visual field, the imaging light ML2 indicates a light beam from the lower right direction in the visual field, the imaging light ML3 indicates a light beam from the upper left direction in the visual field, and the imaging light ML4 indicates a light beam from the lower left direction in the visual field.

In this case, the eye ring ER set as the pupil position PP has such an eye ring shape or pupil size that a horizontal pupil size Wh in the lateral direction or the X direction vertical to the off-axis plane SO is greater than a vertical pupil size Wv in the longitudinal direction or the Y direction that is on the off-axis plane SO and is orthogonal to the optical axis AX. Specifically, the pupil size at the pupil position PP is wider in the lateral direction or the X direction orthogonal to the off-axis plane SO than in the longitudinal direction or the Y direction orthogonal to the lateral direction.

In a case in which the angle of view or the visual field in the lateral direction is greater than the angle of view or the visual field in the longitudinal direction, when a sight line is changed according to the angle of view, the position of the eye moves largely in the lateral direction. Thus, it is desired that the pupil size be increased in the lateral direction. Specifically, the pupil size Wh of the eye ring ER in the lateral direction is greater than the pupil size Wv in the longitudinal direction. With this, when a sight line is largely changed in the lateral direction, cutting of an image can be prevented or suppressed. In a case of the projection optical system 12 illustrated in FIG. 4 and FIG. 5, the FOV in the lateral direction is relatively large, and the FOV in the longitudinal direction is relatively small. As a result, the eye EY or the pupil of the user US also rotates in a large angle range in the lateral direction, and rotates in a small angle range in the longitudinal direction. Thus, according to motion of the eye EY, the pupil size Wh of the eye ring ER in the lateral direction is greater than the pupil size Wv of the eye ring ER in the longitudinal direction.

As is apparent from the description given above, for example, when the FOV of the projection optical system 12 in the longitudinal direction is set to be greater than the FOV in the lateral direction, it is desired that the pupil size Wh of the eye ring ER in the lateral direction be smaller than the pupil size Wv of the eye ring ER in the longitudinal direction. In the above description, when the optical axis AX from the see-through mirror 23 to the pupil position PP is oriented downward, the inclination of the eye ring ER and the size of the eye ring ER in a strict sense are required to be considered with a coordinate system of XO, YO, and ZO as references, which have the optical axis AX as the ZO direction and are inclined downward. In this case, the YO direction in the longitudinal direction does not strictly match with the vertical direction or the Y direction. However, when this inclination is not large, the inclination of the eye ring ER and the size of the eye ring ER may be considered with the coordinate system of X, Y, and Z, which does not cause a problem in an approximate sense.

Although omitted in illustration, when the FOV of the projection optical system 12 is greater in the lateral direction than in the longitudinal direction according to a size relationship relating to the eye ring ER between the pupil size Wh in the lateral direction and the pupil size Wv in the longitudinal direction, it is desired that, with regard to the intermediate pupil IP, the pupil size in the lateral direction corresponding to the X direction be also smaller than the pupil size in the longitudinal direction corresponding to the Y direction.

Figure 7:
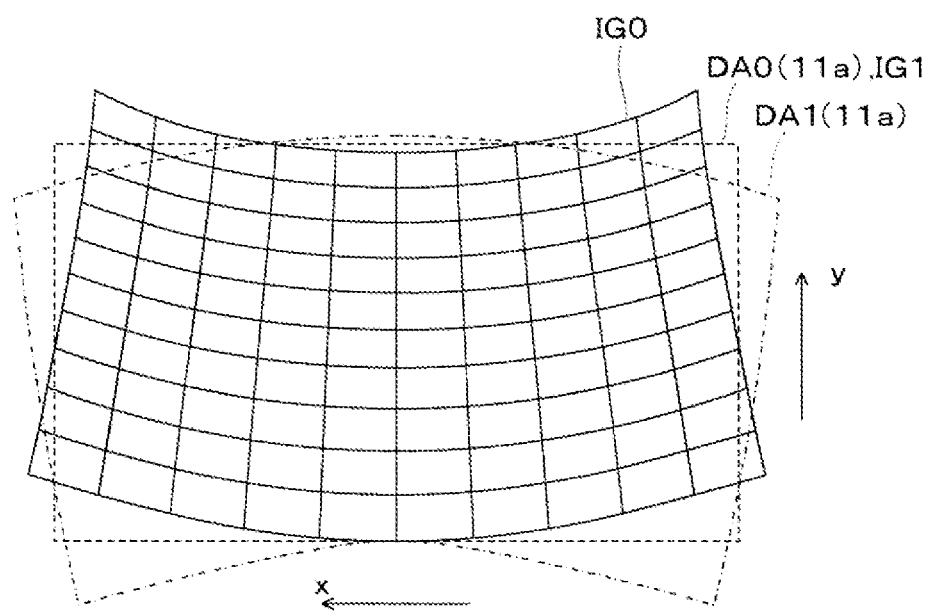
FIG. 7 is a diagram for describing a compulsory distortion of a display image formed on a display element.

As illustrated in FIG. 7, an original projection image IG0 indicating an image formation state by the projection optical system 12 has a relatively large distortion. However, the projection optical system 12 is the off-axis system 112, and hence it is not easy to eliminate distortion such as a trapezoidal distortion. Therefore, even when distortion remains in the projection optical system 12, the original display image is indicated with DA0, and hence a display image formed on the display surface 11a is referred to as a modification image DA1 having distortion in advance. Specifically, the image formed on the display element 11 is referred to as the modification image DA1 having an inverse distortion that cancels distortion generated by the projection lens 21, the prism 22, and the see-through mirror 23.

With this, a pixel array of a projection image IG1 being a virtual image observed at the pupil position PP via the projection optical system 12 can be obtained as a grid pattern corresponding to DA0, and the projection image IG1 can have a rectangular contour. As a result, an aberration can be suppressed in the display module 101A as a whole including the display element 11, while allowing distortion aberration caused at the see-through mirror 23 or the like. When the display surface 11a has a rectangular outline, a margin is formed in the peripheral portion of the display surface 11a by forming a compulsory distortion, but additional information may be displayed in such a margin. The modification image DA1 formed on the display surface 11a is not limited to a display image in which a compulsory distortion is formed by image processing, and, for example, an array of display pixels formed on the display surface 11a may correspond to a compulsory distortion. In this case, image processing for correcting the distortion is not needed. Further, the display surface 11a may be curved to correct an aberration.

As described above, the distortion caused by the projection optical system 12 can be corrected by adding, to the image displayed on the display element 11, the distortion that cancels the distortion caused by the projection optical system 12. In other words, the distortion caused by the projection optical system 12 can be corrected by the display element 11, and hence an optical system allowing occurrence of distortion can be employed. With this, the number of components of the display module can be reduced, and the display module can be reduced in size.

However, when the component accuracy and the assembly accuracy of the optical elements such as the projection lens, the prism, and the see-through mirror that constitute the projection optical system, and the positional relationship between the projection optical system and the display element are deviated from optimal values, specifically, design values, distortion caused by the projection optical system largely varies. As described above, when the image having the distortion that cancels the distortion caused by the projection optical system is displayed on the display device, the distortion shape can be corrected. However, as deviation of the above-mentioned parameters from the optimal values becomes larger, there may be a higher possibility in that resolution of the virtual image is degraded due to the distortion correction. Further, when a binocular head-mounted display is configured, it is required to adjust right and left image positions so as to eliminate the sense of incongruity in a binocular vision. However, when the right and left image positions are adjusted by positional adjustment of the display element, the distortion caused by the projection optical system varies. Thus, it is difficult to achieve both correction of the distortion caused by the projection optical system and adjustment of the right and left image positions in a compatible manner.

A positional adjustment structure of the projection optical system 12 and the display element 11 is described below in detail.

Figure 8:
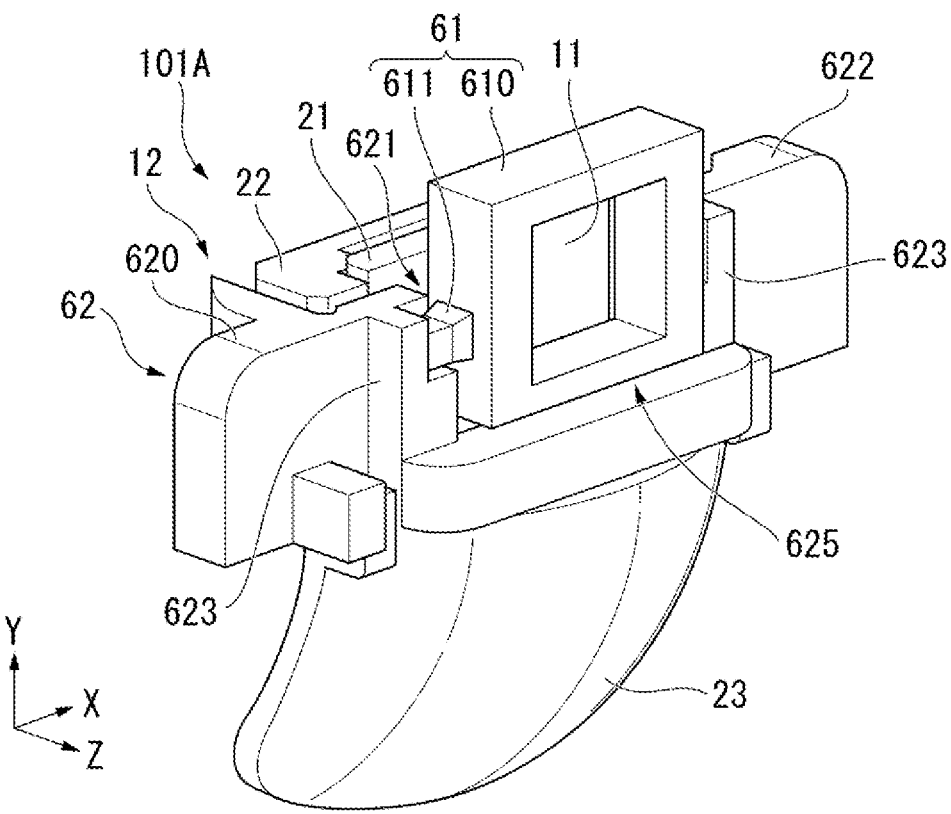
FIG. 8 is a perspective view of a display module.
Figure 9:
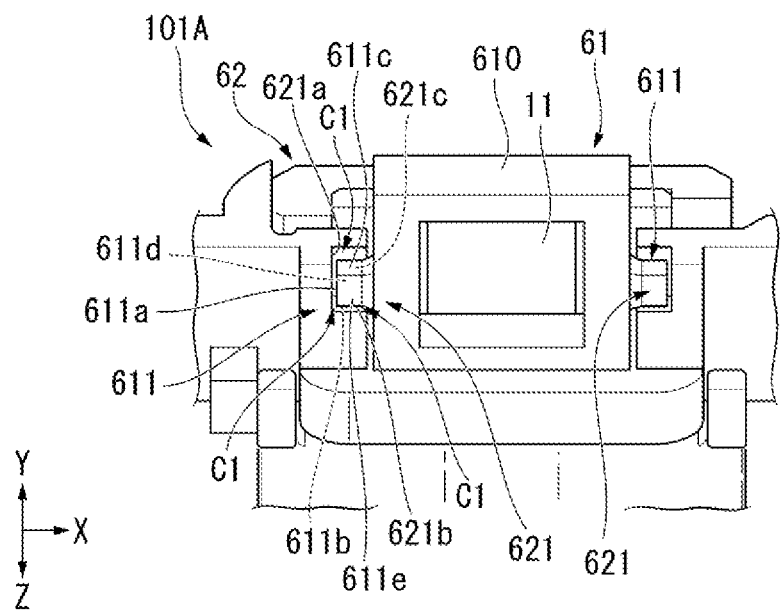
FIG. 9 is a perspective view obtained by enlarging a vicinity of a display element supporting member.
Figure 10:
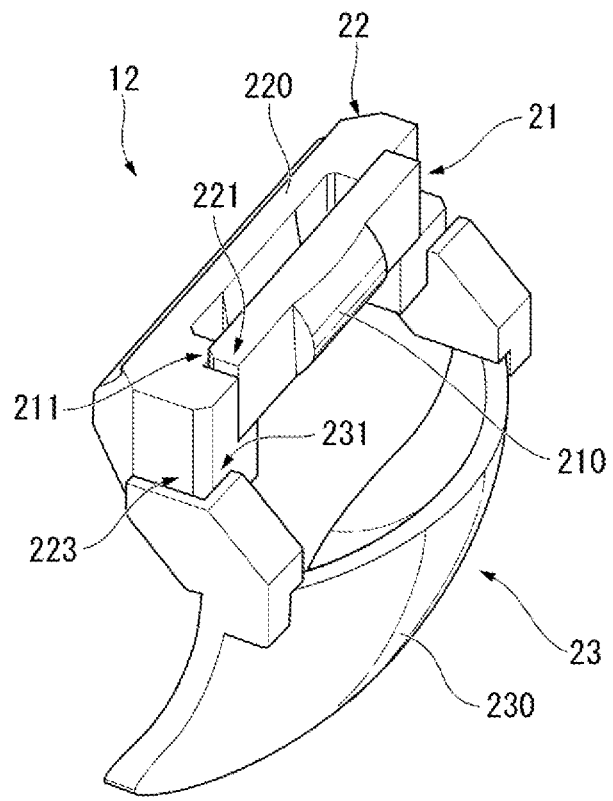
FIG. 10 is a perspective view of the projection optical system.

FIG. 8 is a perspective view of the display module 101A. FIG. 9 is a perspective view obtained by enlarging a vicinity of a display element supporting member. FIG. 10 is a perspective view of the projection optical system 12.

As described above, the first display module 101A and the second display module 101B have the identical configurations. Therefore, also in the description relating to a positioning structure between the projection optical system 12 and the display element 11, a display module is represented by the first display module 101A, and the first display module 101A is simply referred to as the display module 101A.

As illustrated in FIG. 8, the display module 101A includes the display element 11, a display element supporting member 61 that supports the display element 11, the projection optical system 12, and a projection optics supporting member 62 that supports the projection optical system.

The display element supporting member 61 of the present exemplary embodiment corresponds to the first display element supporting member and the second display element supporting member in the scope of the claims. The projection optics supporting member 62 of the present exemplary embodiment corresponds to the first projection optics supporting member and the second projection optics supporting member in the scope of the claims.

As illustrated in FIG. 9, the display element supporting member 61 includes a display element supporting member main body 610 and two protruding portions 611 that protrude from the side surfaces of the display element supporting member main body 610 in the lateral direction.

The protruding portion 611 of the present exemplary embodiment corresponds to the first protruding portion and the second protruding portion in the scope of the claims.

The display element supporting member main body 610 has a rectangular frame-like shape as seen in a direction in which imaging light emitted from the display element 11 advances, specifically, the Z direction, and has an opening portion in the center. The display element 11 is supported on a surface, which faces the projection optical system 12, of the display element supporting member main body 610. A specific supporting structure of the display element 11 is not particularly limited. For example, a configuration in which the display element 11 is bonded to the display element supporting member main body 610 or a configuration in which the display element 11 is supported through intermediation of another supporting member may be employed.

As illustrated in FIG. 9, as seen from the observer, the two protruding portions 611 includes the protruding portion 611 that protrudes rightward from the right side surface of the display element supporting member main body 610 and the protruding portion 611 that protrudes leftward from the left side surface of the display element supporting member main body 610. The two right and left protruding portions 611 have the identical shapes and dimensions, and hence the left protruding portion 611 of the display element supporting member main body 610 is described below.

The protruding portion 611 has a substantially rectangular-parallelepiped shape, and includes a first surface 611a that is orthogonal to the X direction, a second surface 611b that is orthogonal to the Y direction and is a lower surface of the protruding portion 611, a third surface 611c that is opposite to the second surface 611b and is an upper surface of the protruding portion 611, a fourth surface 611d that is orthogonal to the Z direction and is a back surface of the protruding portion 611, and a fifth surface 611e that is opposite to the fourth surface 611d and is a front surface of the protruding portion. Note that the two right and left protruding portions 611 may have shapes and dimensions that are different from each other.

The projection optics supporting member 62 includes a projection optics supporting member main body 620, two recessed portions 621 that are provided in the projection optics supporting member main body 620 and face the protruding portions 611 of the projection optics supporting member, respectively, and an adjustment protruding portion 622 that protrudes from the projection optics supporting member main body 620 in the lateral direction.

The recessed portion 621 of the present exemplary embodiment corresponds to the first recessed portion and the second recessed portion in the scope of the claims. The adjustment protruding portion 622 of the present exemplary embodiment corresponds to the first adjustment protruding portion and the second adjustment protruding portion in the scope of the claims.

As illustrated in FIG. 8, the projection optics supporting member main body 620 includes two supporting members 623 provided at a predetermined interval in the lateral direction, and the space between the two supporting members 623 corresponds to an accommodation portion 625 that accommodates the display element supporting member 61. Each of the supporting members 623 is provided with the recessed portion 621 that faces the protruding portion 611 of the display element supporting member 61 and has a shape and dimension enabling accommodation of the protruding portion 611. The two right and left recessed portions 621 have the identical shapes and dimensions, and hence the left recessed portion 621 of the projection optics supporting member main body 620 is described below.

The recessed portion 621 has a recessed shape to have a substantially rectangular-parallelepiped inner space, and includes a sixth surface 621a orthogonal to the X direction, a seventh surface 621b orthogonal to the Y direction, and an eighth surface 621c orthogonal to the Z direction. Note that the two right and left recessed portions 621 are only required to have shapes and dimensions that are different from each other, and are only required to have shapes and dimensions enabling accommodation of the protruding portions 611 corresponding to the recessed portions 621.

As illustrated in FIG. 10, in the projection optical system 12 of the present exemplary embodiment, the projection lens 21, the prism 22, and the see-through mirror 23 are bonded to each other through intermediation of adhesive layers (not illustrated). Specifically, the projection lens 21, the prism 22, and the see-through mirror 23 are positioned with each other without intermediation of other supporting members.

The projection lens 21 of the present exemplary embodiment corresponds to the first projection lens and the second projection lens in the scope of the claims. The prism 22 of the present exemplary embodiment corresponds to the first prism and the second prism in the scope of the claims. The see-through mirror 23 of the present exemplary embodiment corresponds to the first see-through mirror and the second see-through mirror in the scope of the claims.

The projection lens 21 includes the projection lens main body 210 and a first positioning portion 211 formed integrally with the projection lens main body 210. The prism 22 includes a prism main body 220, and a second positioning portion 221 and a third positioning portion 222 that are formed integrally with the prism main body 220. The see-through mirror 23 includes a see-through mirror main body 230 and a fourth positioning portion 231 formed integrally with the see-through mirror main body 230. The projection lens 21 and the prism 22 are positioned with each other by bringing the first positioning portion 211 and the second positioning portion 221 into contact with each other. The prism 22 and the see-through mirror 23 are positioned with each other by bringing the third positioning portion 222 and the fourth positioning portion 231 into contact with each other.

As described above, in the present exemplary embodiment, the projection lens 21 is positioned with respect to the prism 22, and the see-through mirror 23 is positioned with respect to the prism 22. With this, mutual positioning among the projection lens 21, the prism 22, and the see-through mirror 23 is achieved. Note that, in this example, the prism 22 is selected as a positioning reference among the three optical members, but the projection lens 21 or the see-through mirror 23 may be selected as an optical member functioning as a positioning reference.

As illustrated in FIG. 9, the display element supporting member 61 is accommodated in the accommodation portion 625 of the projection optics supporting member 62 at the position at which the protruding portion 611 is accommodated inside the recessed portion 621. In this state, the first surface 611a of the protruding portion 611 faces the sixth surface 621a of the recessed portion 621, the second surface 611b of the protruding portion 611 faces the seventh surface 621b of the recessed portion 621, and the fourth surface 611d of the protruding portion 611 faces the eighth surface 621c of the recessed portion 621. However, the first surface 611a and the sixth surface 621a, the second surface 611b and the seventh surface 621b, and the fourth surface 611d and the eighth surface 621c face each other, but the two surfaces are not required to be in a direct contact state. Specifically, the protruding portion 611 is arranged inside the recessed portion 621 with a clearance C1 therebetween with the recessed portion 621.

Further, the above-mentioned two surfaces facing each other may be parallel to each other, or may not be parallel to each other. Further, the third surface 611c and the fifth surface 611e of the protruding portion 611 do not face each surface of the recessed portion 621, and are exposed to the outside.

The first surface 611a of the present exemplary embodiment corresponds to the first facing surface and the seventh facing surface in the scope of the claims. The second surface 611b of the present exemplary embodiment corresponds to the second facing surface and the eighth facing surface in the scope of the claims. The fourth surface 611d of the present exemplary embodiment corresponds to the third facing surface and the ninth facing surface in the scope of the claims. The sixth surface 621a of the present exemplary embodiment corresponds to the fourth facing surface and the tenth facing surface in the scope of the claims. The seventh surface 621b of the present exemplary embodiment corresponds to the fifth facing surface and the eleventh facing surface in the scope of the claims. The eighth surface 621c of the present exemplary embodiment corresponds to the sixth facing surface of the twelfth facing surface in the scope of the claims.

The clearances C1 between the first surface 611a and the sixth surface 621a, between the second surface 611b and the seventh surface 621b, and between the fourth surface 611d and the eighth surface 621c have a size approximately from several tens μm to 1 mm, for example, and are larger than a clearance generally required for assembling components. The clearances C1 at the three positions described above are used for adjusting a positional relationship between the display element supporting member 61 and the projection optics supporting member 62 as described later, and hence are not required to have the same size. An adhesive layer (not illustrated) is provided in the clearances C1 at the three positions described above. Specifically, the display element supporting member 61 and the projection optics supporting member 62 are fixed to each other by the adhesive layer provided in the clearance C1 at the three positions described above in a state in which the mutual positional relationship is adjusted.

A positional adjustment structure of the first display module 101A for the right eye and the second display module 101B for the left eye is described below in detail.

Figure 11:
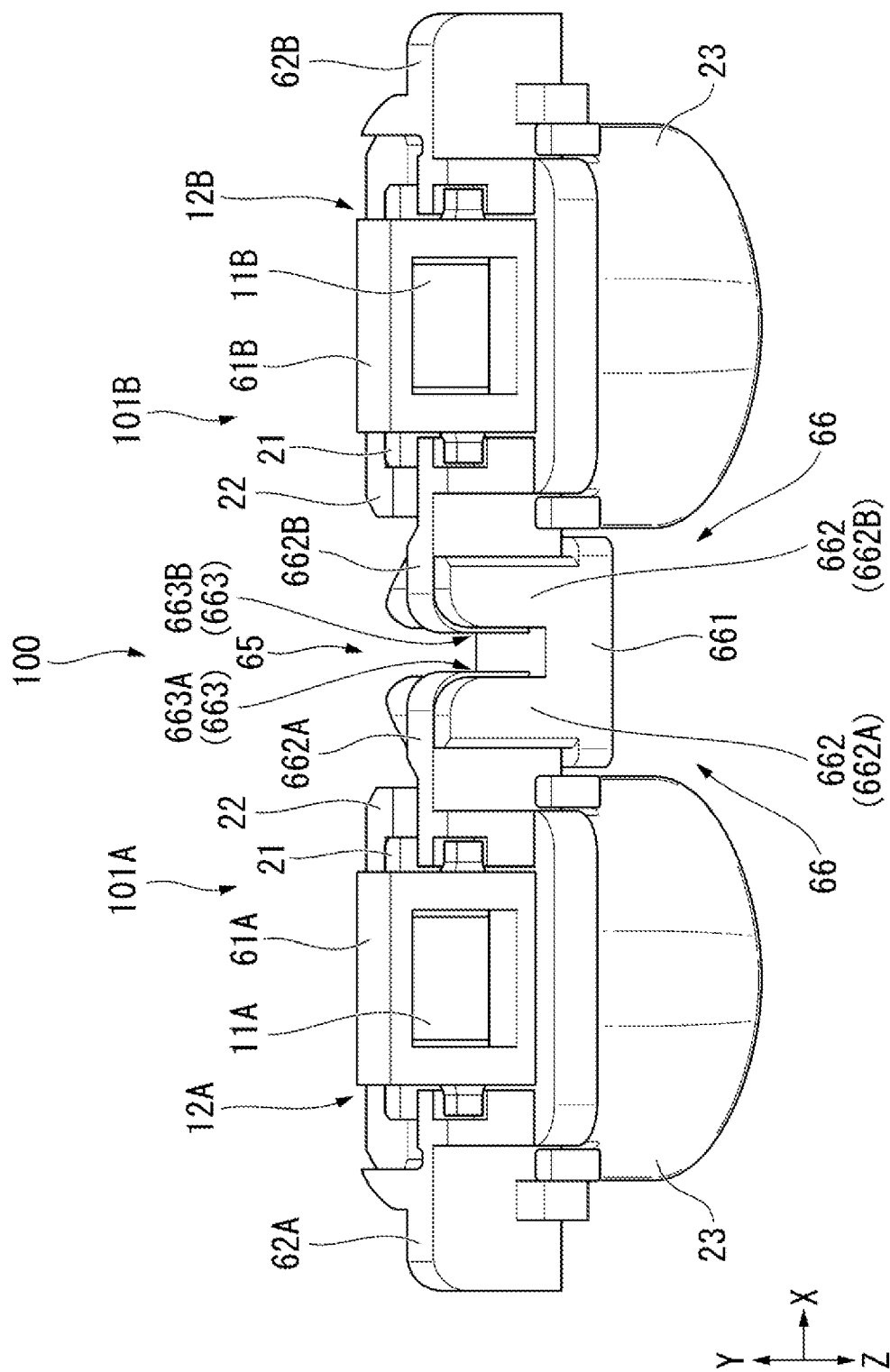
FIG. 11 is a perspective view of a first display module and a second display module.
Figure 12:
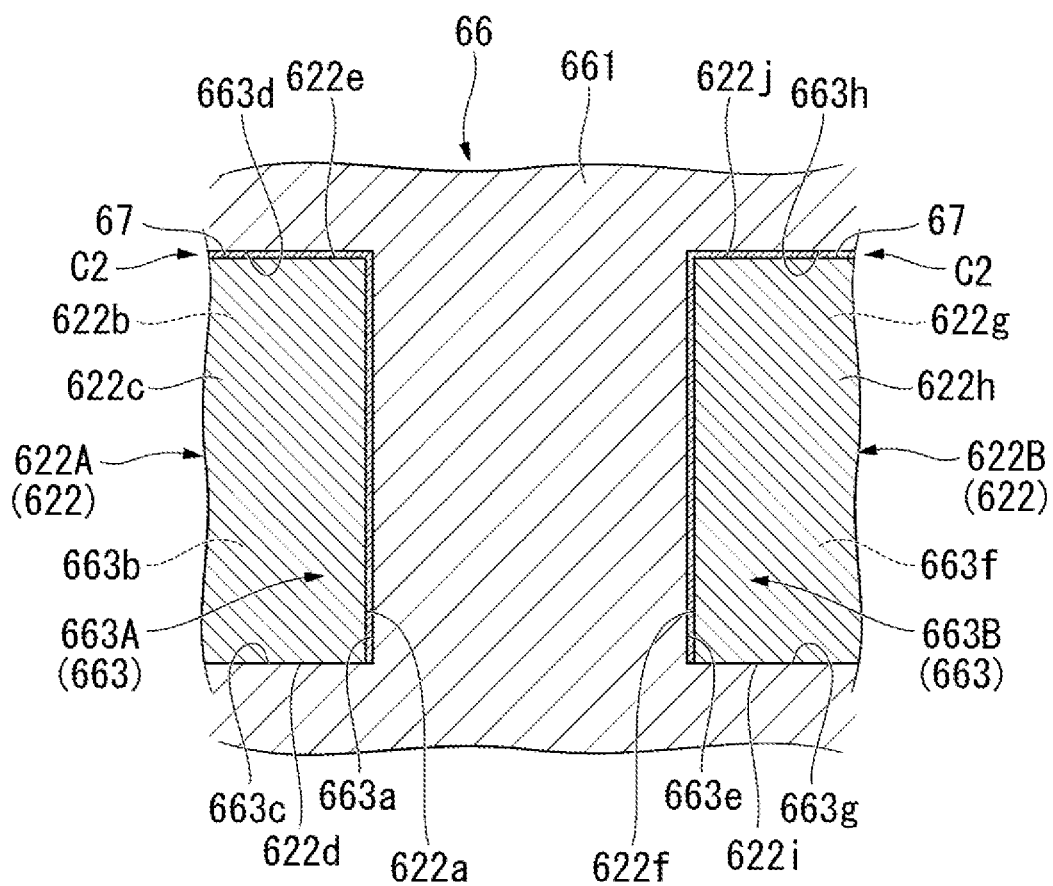
FIG. 12 is a plan view obtained by enlarging a coupling portion.

FIG. 11 is a perspective view of the first display module 101A and the second display module 101B. FIG. 12 is a plan view obtained by enlarging a coupling portion 65 between the first display module 101A and the second display module 101B.

As illustrated in FIG. 11, the virtual image display apparatus 100 of the present exemplary embodiment includes the first display module 101A, the second display module 101B, and the coupling portion 65 that couples the first display module 101A and the second display module 101B to each other. The coupling portion 65 has an adjustment structure that adjusts at least one of a relative rotational position, a relative position in the longitudinal direction, and a relative position in the depth direction between the first projection optics supporting member 62A and the second projection optics supporting member 62B.

Note that, in the description given above, the first display module 101A and the second display module 101B have the identical configurations, and hence the ordinal number being "first" or "second" is omitted from a name of each component. However, in the following description, the ordinal number being "first" or "second" is added to a name of each component in order to distinguish the components of the first display module 101A from the components of the second display module 101B.

The coupling portion 65 of the present exemplary embodiment is provided independently from the first projection optics supporting member 62A and the second projection optics supporting member 62B, and includes a coupling member 66 that couples the first projection optics supporting member 62A and the second projection optics supporting member 62B to each other. The coupling member 66 includes a base portion 661, a nipping portion 662 provided integrally with the base portion 661, and an adjustment recessed portion 663 provided in the base portion 661.

The first projection optics supporting member 62A includes the first adjustment protruding portion 622A for adjusting at least one of the relative rotational position, the relative position in the longitudinal direction, and the relative position in the depth direction with respect to the second projection optics supporting member 62B. The first adjustment protruding portion 622A is constituted of a plate portion protruding from the first projection optics supporting member main body to one side in the lateral direction (the +X direction).

The second projection optics supporting member 62B includes the second adjustment protruding portion 622B for adjusting at least one of the relative rotational position, the relative position in the longitudinal direction, and the relative position in the depth direction with respect to the first projection optics supporting member 62A. The second adjustment protruding portion 622B is constituted of a plate portion protruding from the second projection optics supporting member main body to the other side in the lateral direction (the −X direction).

In the coupling member 66, the nipping portion 662 is constituted of a first nipping portion 662A that nips the first adjustment protruding portion 622A from the depth direction and a second nipping portion 662B that nips the second adjustment protruding portion 622B from the depth direction. As illustrated in FIG. 12, the adjustment recessed portion 663 is constituted of a first adjustment recessed portion 663A that accommodates the first adjustment protruding portion 622A and a second adjustment recessed portion 663B that accommodates the second adjustment protruding portion 622B. Specifically, the coupling member 66 includes the adjustment recessed portion 663 that accommodates the first adjustment protruding portion 622A and the second adjustment protruding portion 622B. In the present exemplary embodiment, the adjustment recessed portion 663 is constituted of the two adjustment recessed portion 663A and 663B that individually accommodates the adjustment protruding portions 622A and 622B, respectively. In place of this configuration, the adjustment recessed portion 663 may be constituted of one adjustment recessed portion that accommodates both the first adjustment protruding portion 622A and the second adjustment protruding portion 622B.

The first adjustment protruding portion 622A includes an eleventh surface 622a orthogonal to the X direction, a twelfth surface 622b that is orthogonal to the Y direction and is a lower surface of the first adjustment protruding portion 622A, a thirteenth surface 622c that is an upper surface of the first adjustment protruding portion 622A, a fourteenth surface 622d that is orthogonal to the Z direction and is a front surface of the first adjustment protruding portion 622A, and a fifteenth surface 622e that is a back surface of the first adjustment protruding portion 622A. Further, the second adjustment protruding portion 622B includes a sixteenth surface 622f orthogonal to the X direction, a seventeenth surface 622g that is orthogonal to the Y direction and is a lower surface of the second adjustment protruding portion 622B, an eighteenth surface 622h that is an upper surface of the second adjustment protruding portion 622B, a nineteenth surface 622i that is orthogonal to the Z direction and is a front surface of the second adjustment protruding portion 622B, and a twentieth surface 622j that is a back surface of the second adjustment protruding portion 622B.

The first adjustment recessed portion 663A includes a twenty-first surface 663a orthogonal to the X direction, a twenty-second surface 663b orthogonal to the Y direction, and a twenty-third surface 663c and a twenty-fourth surface 663d that are orthogonal to the Z direction and are opposite to each other. Further, the second adjustment recessed portion 663B includes a twenty-fifth surface 663e orthogonal to the X direction, a twenty-sixth surface 663f orthogonal to the Y direction, and a twenty-seventh surface 663g and a twenty-eighth surface 663h that are orthogonal to the Z direction and are opposite to each other.

As illustrated in FIG. 11, the first projection optics supporting member 62A is fixed to the coupling member 66 in a state in which the first adjustment protruding portion 622A is accommodated in the first adjustment recessed portion 663A. In this state, as illustrated in FIG. 12, the eleventh surface 622a of the first adjustment protruding portion 622A faces the twenty-first surface 663a of the first adjustment recessed portion 663A, the twelfth surface 622b of the first adjustment protruding portion 622A faces the twenty-second surface 663b of the first adjustment recessed portion 663A, the fourteenth surface 622d of the first adjustment protruding portion 622A faces the twenty-third surface 663c of the first adjustment recessed portion 663A, and the fifteenth surface 622e of the first adjustment protruding portion 622A faces the twenty-fourth surface 663d of the first adjustment recessed portion 663A. However, the eleventh surface 622a and the twenty-first surface 663a, the twelfth surface 622b and the twenty-second surface 663b, the fourteenth surface 622d and the twenty-third surface 663c, and the fifteenth surface 622e and the twenty-fourth surface 663d face each other, but are not required to be in a direct contact state. Specifically, the first adjustment protruding portion 622A is arranged inside the first adjustment recessed portion 663A with a clearance C2 therebetween with the first adjustment recessed portion 663A. Further, the above-mentioned two surfaces facing each other may be parallel to each other, or may not be parallel to each other. Further, the thirteenth surface 622c of the first adjustment protruding portion 622A does not face the surfaces of the first adjustment recessed portion 663A, and is exposed to the outside.

As illustrated in FIG. 11, the second projection optics supporting member 62B is fixed to the coupling member 66 in a state in which the second adjustment protruding portion 622B is accommodated in the second adjustment recessed portion 663B. In this state, as illustrated in FIG. 12, the sixteenth surface 622f of the second adjustment protruding portion 622B faces the twenty-fifth surface 663e of the second adjustment recessed portion 663B, the seventeenth surface 622g of the second adjustment protruding portion 622B faces the twenty-sixth surface 663f of the second adjustment recessed portion 663B, the nineteenth surface 622i of the second adjustment protruding portion 622B faces the twenty-seventh surface 663g of the second adjustment recessed portion 663B, and the twentieth surface 622j of the second adjustment protruding portion 622B faces the twenty-eighth surface 663h of the second adjustment recessed portion 663B. However, the sixteenth surface 622f and the twenty-fifth surface 663e, the seventeenth surface 622g and the twenty-sixth surface 663f, the nineteenth surface 622i and the twenty-seventh surface 663g, and the twentieth surface 622j and the twenty-eighth surface 663h face each other, but are not required to be in a direct contact state. Specifically, the second adjustment protruding portion 622B is arranged inside the second adjustment recessed portion 663B with the clearance C2 therebetween with the second adjustment recessed portion 663B. Further, the above-mentioned two surfaces facing each other may be parallel to each other, or may not be parallel to each other. Further, the eighteenth surface 622h of the second adjustment protruding portion 622B does not face the surfaces of the second adjustment recessed portion 663B, and is exposed to the outside.

The clearances C2 described above have a size approximately from several tens μm to 1 mm, for example, and are larger than a clearance generally required for assembling components. The clearances C2 at the plurality of positions are used for adjusting a positional relationship between the first display module 101A and the second display module 101B as described later, and hence are not required to have the same size. An adhesive layer 67 is provided in the clearances C2 at the plurality of positions. Specifically, the first projection optics supporting member 62A and the second projection optics supporting member 62B are fixed to the coupling member 66 by the adhesive layer 67 provided in the clearances C2 at the plurality of positions described above in a state in which the mutual positional relationship is adjusted, and are coupled to each other through intermediation of the coupling member 66.

When the virtual image display apparatus 100 of the present exemplary embodiment is manufactured, the relative position between the first display element 11A and the first projection optical system 12A is adjusted by positioning the first display element supporting member 61A and the first projection optics supporting member 62A in the first display module 101A, the relative position between the second display element 11B and the second projection optical system 12B is adjusted by positioning the second display element supporting member 61B and the second projection optics supporting member 62B in the second display module 101B, and the display element supporting members 61A and 61B and the projection optics supporting members 62A and 62B are coupled to each other, respectively, by using an adhesive agent. After that, the relative position between the first display module 101A and the second display module 101B is adjusted by performing positional adjustment between the first projection optics supporting member 62A and the coupling member 66 and positional adjustment between the second projection optics supporting member 62B and the coupling member 66, and each of the projection optics supporting members 62A and 62B is coupled to the coupling member 66 by using an adhesive agent.

A method of performing positional adjustment for each member is described specifically.

The positional adjustment between the display element supporting members 61A and 61B and the projection optics supporting members 62A and 62B are commonly shared in the first display module 101A and the second display module 101B. Thus, description is given representatively with the first display module 101A, and the ordinal number "first" of each member is omitted.

First, as illustrated in FIG. 9, the positional adjustment between the display element supporting member 61 and the projection optics supporting member 62 in the display module 101A is performed. At this stage, while checking a display state of a virtual image at the pupil position, the position of the display element supporting member 61 is adjusted in a state in which the position of the projection optics supporting member 62 is fixed.

In this state, the clearance C1 of, for example, approximately 1 mm is provided between the protruding portion 611 and the recessed portion 621. Thus, in a state in which the protruding portion 611 is arranged in the recessed portion 621, each of the relative position in the lateral direction (the X direction), the relative position in the longitudinal direction (the Y direction), and the relative position in the depth direction (the Z direction) between the display element supporting member 61 and the projection optics supporting member 62, and each of the relative rotational position about the X axis, the relative rotational position about the Y axis, and the relative rotational position about the Z axis between the display element supporting member 61 and the projection optics supporting member 62 can be adjusted. Specifically, the clearance C1 is provided between the protruding portion 611 and the recessed portion 621, and hence the positional adjustment in the six axial directions between the display element supporting member 61 and the projection optics supporting member 62 can be performed.

Subsequently, after the positional adjustment in the six axial directions between the display element supporting member 61 and the projection optics supporting member 62 is completed, an adhesive agent is injected in the clearance C1 between the protruding portion 611 and the recessed portion 621 in a state in which the positional relationship between the display element supporting member 61 and the projection optics supporting member 62 is remained, and the adhesive agent is cured. An adhesive agent made of, for example, an ultraviolet curing resin may be used as the adhesive agent, and can be cured by irradiating the adhesive agent after application with ultraviolet light. Note that the type of the adhesive agent is not particularly limited. Further, instead of the above-mentioned procedure, the positional adjustment between the display element supporting member 61 and the projection optics supporting member 62 may be performed after applying the adhesive agent to at least one of the protruding portion 611 and the recessed portion 621, and then the adhesive agent may be cured.

Subsequently, the positional adjustment between the first display module 101A and the second display module 101B is performed. In this case, the relative positional relationship between the first display module 101A and the second display module 101B is adjusted while checking a display state of a virtual image with both the eyes, and states of the right and left virtual images, which include display positions or convergence distances in the horizontal direction, the vertical direction, and the rotational direction, are adjusted.

In this case, as one procedure, for example, the second display module 101B is temporarily fixed to the coupling member 66, and then the positional relationship between the first display module 101A and the coupling member 66 is adjusted. In this state, as illustrated in FIG. 12, the clearance C2 of, for example, approximately 1 mm is provided between the first adjustment protruding portion 622A and the first adjustment recessed portion 663A. Thus, in a state in which the first adjustment protruding portion 622A is arranged in the first adjustment recessed portion 663A, each of the relative position in the lateral direction (the X direction), the relative position in the longitudinal direction (the Y direction), the relative position in the depth direction (the Z direction), the relative rotational position about the X axis, the relative rotational position about the Y axis, and the relative rotational position about the Z axis between the first display module 101A and the coupling member 66 can be adjusted.

With this, the positional relationship between the first display module 101A and the coupling member 66 can be adjusted. As a result, the positional relationship between the first display module 101A and the second display module 101B can be adjusted. Note that, when the positional relationship between the first display module 101A and the second display module 101B cannot be adjusted appropriately by the procedure described above, the positional relationship between the second display module 101B and the coupling member 66 may be further adjusted. Further, reversely to the procedure described above, the first display module 101A may be temporarily fixed to the coupling member 66, and then the positional relationship between the second display module 101B and the coupling member 66 may be adjusted. In any of the procedures, the clearances C2 are provided between the first adjustment protruding portion 622A and the first adjustment recessed portion 663A and between the second adjustment protruding portion 622B and the second adjustment recessed portion 663B in the virtual image display apparatus 100 of the present exemplary embodiment, and hence the positional adjustment in the six axial directions between the first display module 101A and the second display module 101B can be achieved.

Subsequently, after the positional adjustment in the six axial directions between the first display module 101A and the second display module 101B is completed, an adhesive agent is injected in the clearances C2 between the first adjustment protruding portion 622A and the first adjustment recessed portion 663A and between the second adjustment protruding portion 622B and the second adjustment recessed portion 663B in a state in which the positional relationship between the first display module 101A and the second display module 101B is remained, and the adhesive agent is cured. An adhesive agent made of, for example, an ultraviolet curing resin may be used as the adhesive agent, and can be cured by irradiating the adhesive agent after application with ultraviolet light. Note that the type of the adhesive agent is not particularly limited. Further, instead of the above-mentioned procedure, the positional adjustment between the first display module 101A and the second display module 101B may be performed after applying the adhesive agent to at least one of each of the adjustment protruding portions 622A and 622B and each of the adjustment recessed portions 663A and 663B, and then the adhesive agent may be cured.

As described above, the clearances C2 are provided between the first adjustment protruding portion 622A and the first adjustment recessed portion 663A and between the second adjustment protruding portion 622B and the second adjustment recessed portion 663B. With this, the coupling portion 65 has the adjustment structure that adjusts at least one of the relative rotational position, the relative position in the longitudinal direction, and the relative position in the depth direction between the first projection optics supporting member 62A and the second projection optics supporting member 62B. Note that, in place of the configuration of the present exemplary embodiment, the clearance C2 may be provided to one of the spaces between the first adjustment protruding portion 622A and the first adjustment recessed portion 663A and between the second adjustment protruding portion 622B and the second adjustment recessed portion 663B, and the clearance C2 may not be provided to the other space. In this configuration, only the positional adjustment between the coupling member 66 and the display module 101A or 101B to which the clearance C2 is provided can be achieved. Even in this case, the relative positional adjustment between the first display module 101A and the second display module 101B can be achieved. Note that the adjustment structure described above is only required to be a structure enabling the positional adjustment in the process of manufacturing the virtual image display apparatus 100, and a fixed state by an adhesive or the like may be obtained after the positional adjustment. Specifically, the adjustment structure described above does not necessarily indicate a structure enabling the positional adjustment after completion of the virtual image display apparatus 100. However, the positional adjustment may be enabled after completion of the virtual image display apparatus 100.

As described above, a method of manufacturing the virtual image display apparatus 100 of the present exemplary embodiment includes a first adjustment step of adjusting at least one of the relative rotational position, the relative position in the lateral direction, the relative position in the longitudinal direction, and the relative position in the depth direction between the first display element supporting member 61A and the first projection optics supporting member 62A in the first display module 101A in a state in which the protruding portion 611 and the recessed portion 621 are fitted to each other, a second adjustment step of adjusting at least one of the relative rotational position, the relative position in the lateral direction, the relative position in the longitudinal direction, and the relative position in the depth direction between the second display element supporting member 61B and the second projection optics supporting member 62B in the second display module 101B in a state in which the protruding portion 611 and the recessed portion 621 are fitted to each other, and a third adjustment step of using the adjustment structure of the coupling portion 65 and adjusting at least one of the relative rotational position, the relative position in the longitudinal direction, and the relative position in the depth direction between the first projection optics supporting member 62A and the second projection optics supporting member 62B.

As described above, the prism 22 can correct an aberration, and thus the virtual image display apparatus 100 of the present exemplary embodiment can improve resolution, and can reduce a size of the optical system, which leads to size reduction of the entire apparatus. Further, on the off-axis plane SO of the off-axis system 112, the intermediate pupil IP is arranged between the projection lens 21 and the inner reflection surface 22b, on a side closer to the incident surface 22a of the prism 22 than the projection lens 21 and the inner reflection surface 22b. Thus, telecentricity can be easily secured on the display element 11 side while avoiding increase in size of the optical system. Further, when the intermediate pupil IP is arranged at this position, the focal length can be reduced easily, and the magnification can be increased easily. Thus, the display element 11 can be reduced in size while allowing the display element 11 to approach the prism 22 or the like. Further, the intermediate image IM is formed between the prism 22 and the see-through mirror 23, and hence the prism 22 can be reduced in size.

Further, according to the virtual image display apparatus 100 of the present exemplary embodiment, both the relative positional relationship between the display element 11 and the projection optical system 12 in each of the display modules 101A and 101B and the relative positional relationship between the first display module 101A and the second display module 101B can be appropriately adjusted in the assembling steps at the time of manufacturing the virtual image display apparatus 100. With this, distortion of an image can be appropriately corrected, and degradation of resolution of a virtual image caused by distortion correction can be suppressed. At the same time, the sense of incongruity felt when the virtual image is seen by both the eyes can be reduced, and display quality can be improved.

Further, in the virtual image display apparatus 100 of the present exemplary embodiment, the coupling portion 65 includes the coupling member 66 that is provided independently from the first projection optics supporting member 62A and the second projection optics supporting member 62B. Thus, when the positional adjustment between the first display module 101A and the second display module 101B is performed, the coupling member 66 also functions as a supporting member that supports the first projection optics supporting member 62A and the second projection optics supporting member 62B. With this, the positional adjustment work between the first display module 101A and the second display module 101B can be stably performed. Further, a wide contact area can be secured due to the presence of the coupling member 66, and hence mechanical strength of the coupling portion 65 between the first display module 101A and the second display module 101B can be secured.

Further, in the virtual image display apparatus 100 of the present exemplary embodiment, each of the display element supporting members 61A and 61B includes the protruding portion 611 protruding from each of the side surfaces of the display element supporting member main body 610 in the lateral direction, and each of the projection optics supporting members 62A and 62B includes the recessed portion 621 facing each of the protruding portions 611. Thus, the positional adjustment between each of the display element supporting members 61A and 61B and each of the projection optics supporting members 62A and 62B can be performed in a state in which the protruding portion 611 and the recessed portion 621 is fitted to each other.

Further, in the virtual image display apparatus 100 of the present exemplary embodiment, each of the protruding portions 611 includes facing surfaces intersecting with the lateral direction, the longitudinal direction, and the depth direction, respectively, and each of the recessed portions 621 includes the facing surfaces facing the facing surfaces of each of the protruding portions 611. Thus, the positional adjustment in the six axial directions between each of the display element supporting members 61A and 61B and each of the projection optics supporting members 62A and 62B can be accurately performed.

Further, in the virtual image display apparatus 100 of the present exemplary embodiment, the projection lens 21, the prism 22, and the see-through mirror 23 constituting each of the projection optical systems 12A and 12B are coupled to each by the adhesive layer without intermediation of other members. Thus, each of the display modules 101A and 101B can be reduced in size, the positioning accuracy of the projection lens 21, the prism 22, and the see-through mirror 23 can be secured.

Second Exemplary Embodiment

Figure 13:
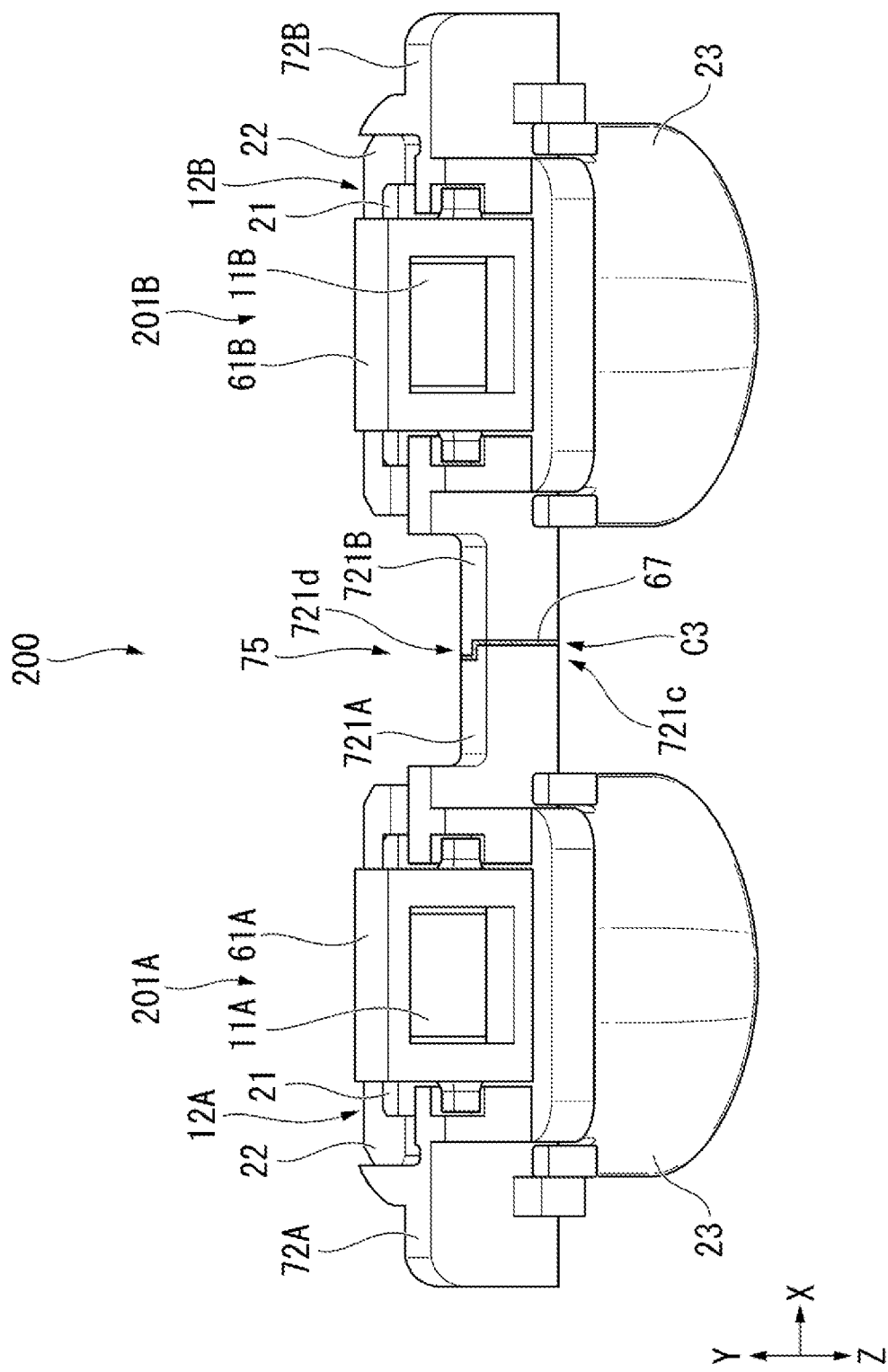
FIG. 13 is a perspective view of a first display module and a second display module in a virtual image display apparatus of a second exemplary embodiment.

With reference to FIG. 13, a second exemplary embodiment of the present disclosure is described below.

The basic configuration of a virtual image display apparatus of the second exemplary embodiment is the same as that of the first exemplary embodiment except in a configuration of a coupling portion. Therefore, the overall configuration of the virtual image display apparatus is omitted in description.

FIG. 13 is a perspective view of a first display module 201A and a second display module 201B in a virtual image display apparatus 200 of the second exemplary embodiment.

In FIG. 13, the components common to those of the drawings used in the first exemplary embodiment are denoted with the same reference symbols, and the description thereof is omitted.

In the virtual image display apparatus 100 of the first exemplary embodiment, the coupling portion 65 includes the coupling member 66 that couples the first display module 101A and the second display module 101B to each other. In view of this, in the virtual image display apparatus 200 of the present exemplary embodiment, a coupling portion 75 does not include a coupling member that couples the first display module 201A and the second display module 201B to each other.

As illustrated in FIG. 13, in the virtual image display apparatus 200 of the present exemplary embodiment, the coupling portion 75 includes a first coupling portion 721A integrally provided with a first projection optics supporting member 72A and a second coupling portion 721B integrally provided with a second projection optics supporting member 72B.

The first coupling portion 721A extends from the first projection optics supporting member main body to one side in the lateral direction (the +X direction). A leading end portion of the first coupling portion 721A, which extends in the +X direction, is provided with a first engaging portion 721c that adjusts the relative rotational position, the relative position in the lateral direction, the relative position in the longitudinal direction, and the relative position in the depth direction with respect to the second projection optics supporting member 72B. The second coupling portion 721B extends from the second projection optics supporting member main body to the other side in the lateral direction (the −X direction). A leading end portion of the second coupling portion 721B, which extends in the −X direction, is provided with a second engaging portion 721d that adjusts the relative rotational position, the relative position in the lateral direction, the relative position in the longitudinal direction, and the relative position in the depth direction with respect to the first projection optics supporting member 72A.

Specifically, the first engaging portion 721c is constituted of a protruding portion and a recessed portion. The protruding portion is positioned in the front (the +Z direction), and protrudes to a side on which the second projection optics supporting member 72B is provided. The recessed portion is positioned in the back with respect to the protruding portion (the −Z direction), and is recessed to a side opposite to the side on which the second projection optics supporting member 72B is provided. The second engaging portion 721d is constituted of a protruding portion and a recessed portion. The protruding portion is positioned in the back (the −Z direction), and protrudes to a side on which the first projection optics supporting member 72A is provided. The recessed portion is positioned in the front with respect to the protruding portion (the +Z direction), and is recessed to a side opposite to the side on which the first projection optics supporting member 72A is provided. The first projection optics supporting member 72A and the second projection optics supporting member 72B are arranged at such positions that the protruding portion of the first engaging portion 721c and the recessed portion of the second engaging portion 721d are engaged with each other and the recessed portion of the first engaging portion 721c and the protruding portion of the second engaging portion 721d are engaged with each other.

A clearance C3 is provided between the first engaging portion 721c and the second engaging portion 721d. The clearance C3 has a size a size approximately from several tens μm to 1 mm, for example. The adhesive layer 67 is provided in the clearance C3. Specifically, in a state in which the mutual positional relationship is adjusted, the first projection optics supporting member 72A and the second projection optics supporting member 72B are coupled to each other by the adhesive layer 67 provided in the clearance C3. As described above, the engagement state between the first engaging portion 721c and the second engaging portion 721d may be achieved by fixation with a coupling agent such as the adhesive layer 67 or the like or by fitting between the protruding portions and the recessed portions without a coupling agent.

Other configurations of the virtual image display apparatus 200 are the same as those of the virtual image display apparatus 100 of the first exemplary embodiment.

When the positional adjustment between the first display module 201A and the second display module 201B is performed in the virtual image display apparatus 200 of the present exemplary embodiment, the positional relationship between the first display module 201A and the second display module 201B is adjusted while moving the first display module 201A in a state in which, for example, a freely-selected jig holds the second display module 201B. In this state, the clearance C3 of, for example, approximately 1 mm is provided between the first engaging portion 721c and the second engaging portion 721d, and hence each of the relative position in the lateral direction (the X direction), the relative position in the longitudinal direction (the Y direction), and the relative position in the depth direction (the Z direction) between the first display module 201A and the second display module 201B, and each of the relative rotational position about the X axis, the relative rotational position about the Y axis, and the relative rotational position about the Z axis between the first display module 201A and the second display module 201B can be adjusted. Similarly to the first exemplary embodiment, the adjustment structure of the present exemplary embodiment is only required to be a structure enabling the positional adjustment in the process of manufacturing the virtual image display apparatus 200, and a fixed state by the adhesive layer 67 may be obtained after the positional adjustment.

The present exemplary embodiment can also obtain effects similar to those in the first exemplary embodiment, such as an effect of reducing a size of the virtual image display apparatus 200, an effect of reducing the sense of incongruity when a virtual image is seen by both the eyes while appropriately correcting distortion of the virtual image, and an effect of improving display quality.

Particularly, in the present exemplary embodiment, the coupling portion 75 does not include a coupling member that is provided independently from the first display module 201A and the second display module 201B, and hence the number of components of the virtual image display apparatus 200 can be reduced.

Note that the technical scope of the present disclosure is not limited to the above-described exemplary embodiments, and various modifications can be made to the above-described exemplary embodiments without departing from the spirit and gist of the present disclosure.

For example, in the virtual image display apparatus of each of the above-described exemplary embodiments the virtual image display apparatus, the coupling portion has the adjustment structure configured to perform the positional adjustment in the six axial directions between the first display module and the second display module, but may have an adjustment structure configured to perform positional adjustment in five axial directions except the relative position in the lateral direction.

In each of the above-described exemplary embodiments, the plurality of surfaces constituting each protruding portion and each recessed portion are orthogonal to each other. However, the plurality of surfaces may not necessarily be orthogonal to each other, and the adjacent surfaces may form an acute angle or an obtuse angle therebetween, for example. Further, in each of the above-described exemplary embodiments, the protruding portion and the recessed portion each having a substantially rectangular-parallelepiped shape are provided. In place of this configuration, for example, the protruding portion may be constituted of a pin, the recessed portion may be constituted of a hole, and the positional adjustment between the two optical members may be performed by fitting the pin into the hole having a clearance. Further, in each of the above-described exemplary embodiments, as the coupling portion, the projection optics supporting members of the respective display modules include the adjustment protruding portions, and the coupling member includes the adjustment recessed portions. In contrast to this configuration, the coupling member may include the adjustment protruding portions, and the projection optics supporting members of the respective display modules may include the adjustment recessed portions that accommodate the adjustment protruding portions therein.

Each of the above-described exemplary embodiments shows the example in which the projection lens, the prism, and the see-through mirror that constitute the projection optical system are bonded to each other through intermediation of the adhesive layer. Alternatively, the projection lens, the prism, and the see-through mirror may be coupled to each other through intermediation of other supporting members. Further, in each of the above-described exemplary embodiments, the projection lens is constituted of a single lens, but may be constituted of a plurality of lenses. Further, in each of the above-described exemplary embodiments, the projection lens, the prism, and the see-through mirror are given as examples of the optical members constituting the projection optical system. Alternatively, for example, optical members such as a reflection type volume hologram and a Fresnel lens may be used.

Further, the specific configuration such as the number, the arrangement, the shape, and the material of each of the various components constituting the virtual image display apparatus is not limited to that in each of the above-described exemplary embodiments, and may be appropriately changed.

Further, in each of the above-described exemplary embodiments, the head-mounted display is given as one example of the virtual image display apparatus. Alternatively, the present disclosure may be applied to, for example, a so-called hand-held display used by holding an apparatus main body with a hand and looking into the display like a pair of binocular glasses.

The virtual image display apparatus according to one aspect of the present disclosure may have the following configurations.

The virtual image display apparatus according to one aspect of the present disclosure includes a first display module configured to form a first virtual image for a right eye, a second display module configured to form a second virtual image for a left eye, and a coupling portion configured to couple the first display module and the second display module to each other, wherein the first display module includes a first display element configured to emit first imaging light for forming an image for the right eye, a first display element supporting member configured to support the first display element, a first projection optical system configured to project the first imaging light emitted from the first display element to form a first exit pupil, and a first projection optics supporting member configured to support the first projection optical system, the first display element supporting member includes any one of a first protruding portion and a first recessed portion, and the first projection optics supporting member includes another one of the first protruding portion and the first recessed portion, the first protruding portion is arranged inside the first recessed portion with a clearance from the first recessed portion, the second display module includes a second display element configured to emit second imaging light for forming an image for the left eye, a second display element supporting member configured to support the second display element, a second projection optical system configured to project the second imaging light emitted from the second display element to form a second exit pupil, and a second projection optics supporting member configured to support the second projection optical system, the second display element supporting member includes any one of a second protruding portion and a second recessed portion, and the second projection optics supporting member includes another one of the second protruding portion and the second recessed portion, the second protruding portion is arranged inside the second recessed portion with a clearance from the second recessed portion, and the coupling portion has an adjustment structure configured to adjust at least one of a relative rotational position, a relative position in a longitudinal direction, and a relative position in a depth direction between the first projection optics supporting member and the second projection optics supporting member.

In the virtual image display apparatus according to one aspect of the present disclosure, the coupling portion may include a coupling member that is provided independently from the first projection optics supporting member and the second projection optics supporting member and is configured to couple the first projection optics supporting member and the second projection optics supporting member to each other, the first projection optics supporting member may include a first adjustment protruding portion configured to adjust at least one of the relative rotational position, the relative position in the longitudinal direction, and the relative position in the depth direction with respect to the second projection optics supporting member, the second projection optics supporting member may include a second adjustment protruding portion configured to adjust at least one of the relative rotational position, the relative position in the longitudinal direction, and the relative position in the depth direction with respect to the first projection optics supporting member, the coupling member may include an adjustment recessed portion configured to accommodate the first adjustment protruding portion and the second adjustment protruding portion, and a clearance may be provided between the adjustment recessed portion and the first adjustment protruding portion and between the adjustment recessed portion and the second adjustment protruding portion.

In the virtual image display apparatus according to one aspect of the present disclosure, the coupling portion may include a first coupling portion integrally provided with the first projection optics supporting member and a second coupling portion integrally provided with the second projection optics supporting member, the first coupling portion may include a first engaging portion configured to adjust at least one of the relative rotational position, the relative position in the longitudinal direction, and the relative position in the depth direction with respect to the second projection optics supporting member, the second coupling portion may include a second engaging portion engaged with the first engaging portion and configured to adjust at least one of the relative rotational position, the relative position in the longitudinal direction, and the relative position in the depth direction with respect to the first projection optics supporting member, and the first engaging portion may be arranged with a clearance from the second engaging portion.

In the virtual image display apparatus according to one aspect of the present disclosure, the first display element supporting member may include a first display element supporting member main body and the first protruding portion protruding from a side surface of the first display element supporting member main body in a lateral direction, the first projection optics supporting member may include the first recessed portion facing the first protruding portion, the second display element supporting member may include a second display element supporting member main body and the second protruding portion protruding from a side surface of the second display element supporting member main body in the lateral direction, and the second projection optics supporting member may include the second recessed portion facing the second protruding portion.

In the virtual image display apparatus according to one aspect of the present disclosure, the first protruding portion may include a first facing surface intersecting with the lateral direction, the second facing surface intersecting with the longitudinal direction, and the third facing surface intersecting with the depth direction, the first recessed portion may include a fourth facing surface facing the first facing surface, a fifth facing surface facing the second facing surface, and a sixth facing surface facing the third facing surface, the second protruding portion may include a seventh facing surface intersecting with the lateral direction, an eighth facing surface intersecting with the longitudinal direction, and a ninth facing surface intersecting with the depth direction, and the second recessed portion may include a tenth facing surface facing the seventh facing surface, an eleventh facing surface facing the eighth facing surface, and a twelfth facing surface facing the ninth facing surface.

In the virtual image display apparatus according to one aspect of the present disclosure, the first projection optical system may include a first projection lens configured to focus the first imaging light emitted from the first display element, a first prism configured to receive the first imaging light emitted from the first projection lens while refracting the first imaging light at an incident surface, totally reflect the first imaging light at an inner reflection surface, and emit the first imaging light from an emitting surface while refracting the first imaging light, and a first see-through mirror configured to reflect the first imaging light emitted from the first prism to a pupil position to form the first exit pupil, the first projection lens, the first prism, and the first see-through mirror may be bonded to each other through intermediation of an adhesive layer, the second projection optical system may include a second projection lens configured to focus the second imaging light emitted from the second display element, a second prism configured to cause the second imaging light emitted from the second projection lens to enter an incident surface while refracting the second imaging light, totally reflect the second imaging light at an inner reflection surface, and emit the second imaging light from an emitting surface while refracting the second imaging light, and a second see-through mirror configured to reflect the second imaging light emitted from the second prism to a pupil position to form the second exit pupil, and the second projection lens, the second prism, and the second see-through mirror may be coupled to each other through intermediation of an adhesive layer.

In the virtual image display apparatus according to one aspect of the present disclosure, an image displayed on the first display element may have distortion to cancel distortion generated by the first projection lens, the first prism, and the first see-through mirror, and an image displayed on the second display element may have distortion to cancel distortion generated by the second projection lens, the second prism, and the second see-through mirror.

The method of manufacturing a virtual image display apparatus according to one aspect of the present disclosure may have the following configurations.

The method of manufacturing a virtual image display apparatus according to one aspect of the present disclosure, the virtual image display apparatus including a first display module configured to form a first virtual image for a right eye, a second display module configured to form a second virtual image for a left eye, and a coupling portion configured to couple the first display module and the second display module to each other, the first display module including a first display element configured to emit first imaging light for the right eye, a first display element supporting member configured to support the first display element, a first projection optical system configured to project the first imaging light emitted from the first display element to form a first exit pupil, and a first projection optics supporting member configured to support the first projection optical system, the first display element supporting member including any one of a first protruding portion and a first recessed portion, and the first projection optics supporting member including another one of the first protruding portion and the first recessed portion, the first protruding portion being arranged inside the first recessed portion with a clearance from the first recessed portion, the second display module including a second display element configured to emit second imaging light for the left eye, a second display element supporting member configured to support the second display element, a second projection optical system configured to project the second imaging light emitted from the second display element to form a second exit pupil, and a second projection optics supporting member configured to support the second projection optical system, the second display element supporting member including any one of a second protruding portion and a second recessed portion, and the second projection optics supporting member including another one of the second protruding portion and the second recessed portion, the second protruding portion being arranged inside the second recessed portion with a clearance from the second recessed portion, and the coupling portion having an adjustment structure configured to adjust a relative positional relationship between the first projection optics supporting member and the second projection optics supporting member, the method including a first adjustment step for adjusting at least one of a relative rotational position, a relative position in a longitudinal direction, a relative position in a lateral direction, and a relative position in a depth direction between the first display element supporting member and the first projection optics supporting member in a state in which the first protruding portion and the first recessed portion are fitted to each other, a second adjustment step for adjusting at least one of a relative rotational position, a relative position in a longitudinal direction, a relative position in the lateral direction, and a relative position in the depth direction between the second display element supporting member and the second projection optics supporting member in a state in which the second protruding portion and the second recessed portion are fitted to each other, and a third adjustment step for adjusting, using the adjustment structure of the coupling portion, at least one of a relative rotational position, a relative position in the longitudinal direction, and a relative position in the depth direction between the first projection optics supporting member and the second projection optics supporting member.

What is claimed is:

1. A virtual image display apparatus, comprising:
   a first display module;
   a second display module; and
   a coupling portion configured to couple the first display module and the second display module to each other, the coupling portion having an adjustment structure, wherein
   the adjustment structure adjusts the position of the first display module with respect to the second display module at least in a longitudinal direction that intersects a lateral direction toward the second display module from the first display module and in a depth direction that intersects the longitudinal direction and the lateral direction respectively,
   the adjustment structure adjusts the position of the first display module with respect to the second display module at least in a rotation direction that rotates around an axis in the longitudinal and in a rotation position that rotates around axis in the depth direction.

2. The virtual image display apparatus according to claim 1, wherein
   the first display module includes:
     a first display element supporting member supporting the first display element that emits a first image light, and
     a first projection optics supporting member supporting a first projection optical system that emits the image light from the first display element,
   the first display element supporting member includes one of a first protruding portion or a first recessed portion,
   the first projection optics supporting member includes another one of the first protruding portion or the first recessed portion,
   the first protruding portion is arranged the first recessed portion,
   the second display module includes:
     a second display element supporting member supporting the second display element that emits a second image light, and
     a second projection optics supporting member supporting a second projection optical system that emits the image light from the second display element,
   the second display element supporting member includes one of a second protruding portion or a second recessed portion,
   the second projection optics supporting member includes another one of the second protruding portion or the second recessed portion,
   the second protruding portion is arranged the second recessed portion.

3. The virtual image display apparatus according to claim 2, wherein
   the first projection optics supporting member includes a first adjustment protruding portion,
   the second projection optics supporting member includes a second adjustment protruding portion,
   the coupling member includes a first adjustment recessed portion that arranges the first adjustment protruding portion and a second adjustment recessed portion that arranges the second adjustment protruding portion.

4. The virtual image display apparatus according to claim 2, wherein
   the coupling portion includes a first coupling portion integrally provided with the first projection optics supporting member and a second coupling portion integrally provided with the second projection optics supporting member,
   the first coupling portion includes a first engaging portion configured to adjust at least one of the relative rotational position, the relative position in the longitudinal direction, and the relative position in the depth direction with respect to the second projection optics supporting member, and
   the second coupling portion includes a second engaging portion engaged with the first engaging portion and configured to adjust at least one of the relative rotational position, the relative position in the longitudinal direction, and the relative position in the depth direction with respect to the first projection optics supporting member.

5. The virtual image display apparatus according to claim 2, wherein
the first display element supporting member includes a first display element supporting member main body and the first protruding portion protruding from a side surface of the first display element supporting member main body in a lateral direction,
the first projection optics supporting member includes the first recessed portion facing the first protruding portion,
the second display element supporting member includes a second display element supporting member main body and the second protruding portion protruding from a side surface of the second display element supporting member main body in the lateral direction, and
the second projection optics supporting member includes the second recessed portion facing the second protruding portion.

6. The virtual image display apparatus according to claim 5, wherein
the first protruding portion includes a first facing surface intersecting with the lateral direction, the second facing surface intersecting with the longitudinal direction, and the third facing surface intersecting with the depth direction,
the first recessed portion includes a fourth facing surface facing the first facing surface, a fifth facing surface facing the second facing surface, and a sixth facing surface facing the third facing surface,
the second protruding portion includes a seventh facing surface intersecting with the lateral direction, an eighth facing surface intersecting with the longitudinal direction, and a ninth facing surface intersecting with the depth direction, and
the second recessed portion includes a tenth facing surface facing the seventh facing surface, an eleventh facing surface facing the eighth facing surface, and a twelfth facing surface facing the ninth facing surface.

7. The virtual image display apparatus according to claim 2, wherein
the first projection optical system includes:
a first projection lens configured to focus the first imaging light emitted from the first display element;
a first prism configured to receive the first imaging light emitted from the first projection lens while refracting the first imaging light at an incident surface, totally reflect the first imaging light at an inner reflection surface, and emit the first imaging light from an emitting surface while refracting the first imaging light; and
a first see-through mirror configured to reflect the first imaging light emitted from the first prism to a pupil position to form the first exit pupil,
the first projection lens, the first prism, and the first see-through mirror are bonded to each other through intermediation of an adhesive layer,
the second projection optical system includes:
a second projection lens configured to focus the second imaging light emitted from the second display element,
a second prism configured to cause the second imaging light emitted from the second projection lens to enter an incident surface while refracting the second imaging light, totally reflect the second imaging light at an inner reflection surface, and emit the second imaging light from an emitting surface while refracting the second imaging light; and
a second see-through mirror configured to reflect the second imaging light emitted from the second prism to a pupil position to form the second exit pupil, and
the second projection lens, the second prism, and the second see-through mirror are coupled to each other through intermediation of an adhesive layer.

8. The virtual image display apparatus according to claim 7, wherein
an image displayed on the first display element has distortion to cancel distortion generated by the first projection lens, the first prism, and the first see-through mirror, and
an image displayed on the second display element has distortion to cancel distortion generated by the second projection lens, the second prism, and the second see-through mirror.

* * * * *